(12) United States Patent
Lee et al.

(10) Patent No.: US 12,356,898 B2
(45) Date of Patent: Jul. 15, 2025

(54) PLANT CULTIVATION SYSTEM

(71) Applicants: Gyeongnyeong Lee, Seoul (KR);
Moosong Lee, Seoul (KR); Gabin Lee,
Seoul (KR)

(72) Inventors: Gyeongnyeong Lee, Seoul (KR);
Moosong Lee, Seoul (KR); Gabin Lee,
Seoul (KR)

( * ) Notice: Subject to any disclaimer, the term of this patent is extended or adjusted under 35 U.S.C. 154(b) by 13 days.

(21) Appl. No.: 18/271,159

(22) PCT Filed: Dec. 14, 2021

(86) PCT No.: PCT/KR2021/019007
§ 371 (c)(1),
(2) Date: Jul. 6, 2023

(87) PCT Pub. No.: WO2022/149747
PCT Pub. Date: Jul. 14, 2022

(65) Prior Publication Data
US 2024/0049651 A1    Feb. 15, 2024

(30) Foreign Application Priority Data

Jan. 8, 2021  (KR) .................. 10-2021-0002705

(51) Int. Cl.
| A01G 9/029 | (2018.01) |
| A01C 1/02 | (2006.01) |
| A01G 9/08 | (2006.01) |
| A01G 9/14 | (2006.01) |
| A01G 9/24 | (2006.01) |

(52) U.S. Cl.
CPC .............. *A01G 9/14* (2013.01); *A01G 9/0299* (2018.02); *A01G 9/24* (2013.01)

(58) Field of Classification Search
CPC ......... A01G 9/0299; A01G 9/088; A01C 1/02
See application file for complete search history.

(56) References Cited

U.S. PATENT DOCUMENTS

| 2,884,022 A | * | 4/1959 | Geary ................... A01G 9/081 |
| | | | 222/196 |
| 2008/0209800 A1 | * | 9/2008 | Van Rijn ............... A01G 9/088 |
| | | | 47/39 |

FOREIGN PATENT DOCUMENTS

| EP | 1407987 A1 | * | 4/2004 | ............. A01G 9/088 |
| JP | 2012024076 A | | 2/2012 | |
| JP | 2015012826 A | | 1/2015 | |
| JP | 2015501157 A | | 1/2015 | |
| JP | 2015208255 A | | 11/2015 | |

(Continued)

OTHER PUBLICATIONS

International search report of PCT/KR2021/019007, Mar. 25, 2022, Englsih trasnaltion.

*Primary Examiner* — Kristen C Hayes
(74) *Attorney, Agent, or Firm* — STIP Law Group, LLC

(57) ABSTRACT

An embodiment of a plant cultivation system comprises at least one plant cultivation guide in which a plurality of containers planted with plants are arranged and supported, wherein the plant cultivation guide having a starting part positioned at a central part so that the container is loaded to begin growing plants, and a harvesting part positioned along a circumference of the central part so that plants are harvested, the containers are sequentially transported from the starting part to the harvesting part and continuously cultivated according to the growth stage of the planted plants.

27 Claims, 27 Drawing Sheets

(56) References Cited

FOREIGN PATENT DOCUMENTS

| | | | |
|---|---|---|---|
| JP | 2019535248 | A | 12/2019 |
| KR | 101376178 | B1 | 3/2014 |
| KR | 20170128592 | A | 11/2017 |
| KR | 20190050573 | A | 5/2019 |
| KR | 2019141082 | A | 8/2019 |
| KR | 102027660 | B1 | 10/2019 |
| KR | 20200029229 | A | 3/2020 |
| KR | 20200136458 | A | 12/2020 |

\* cited by examiner

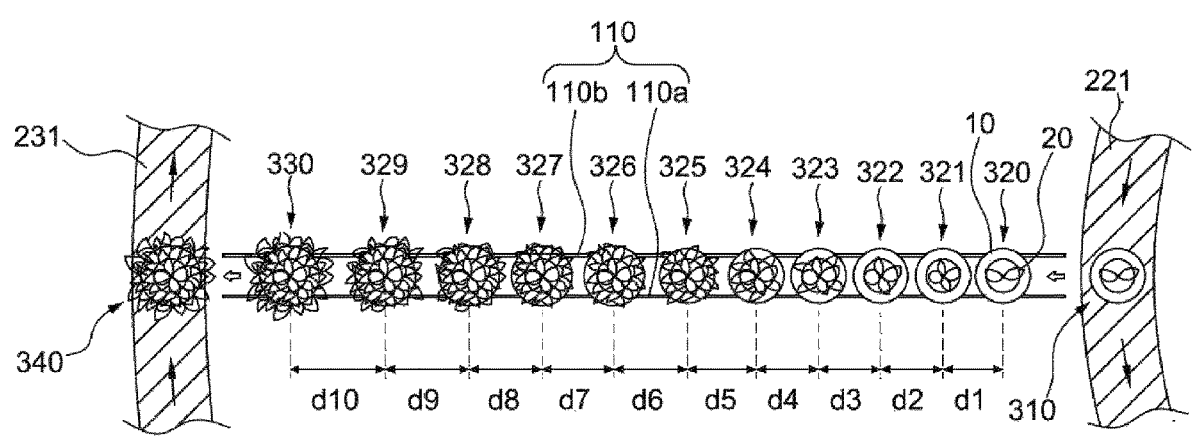
[FIG. 1]

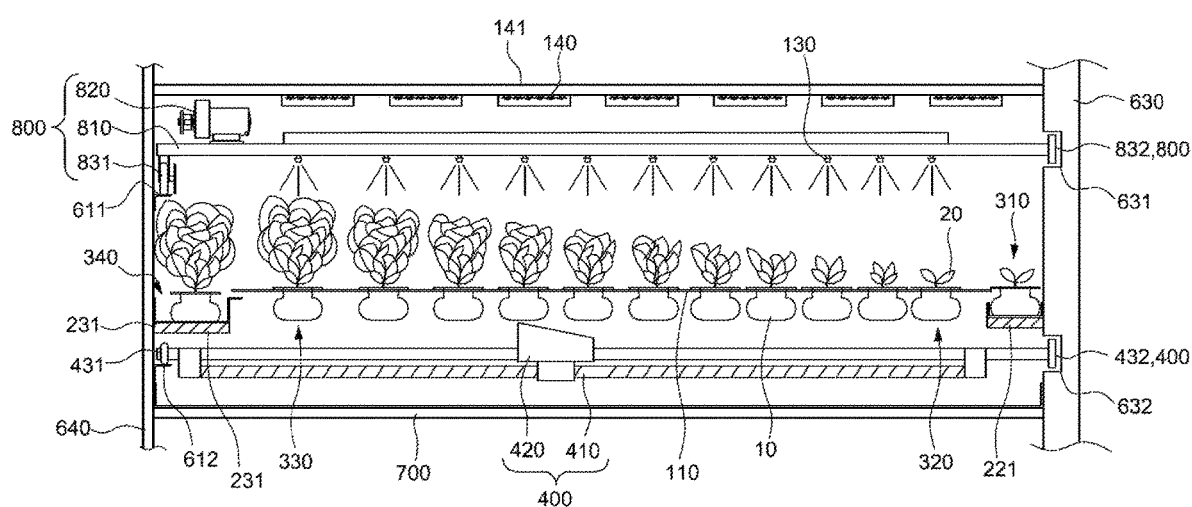
[FIG. 2]

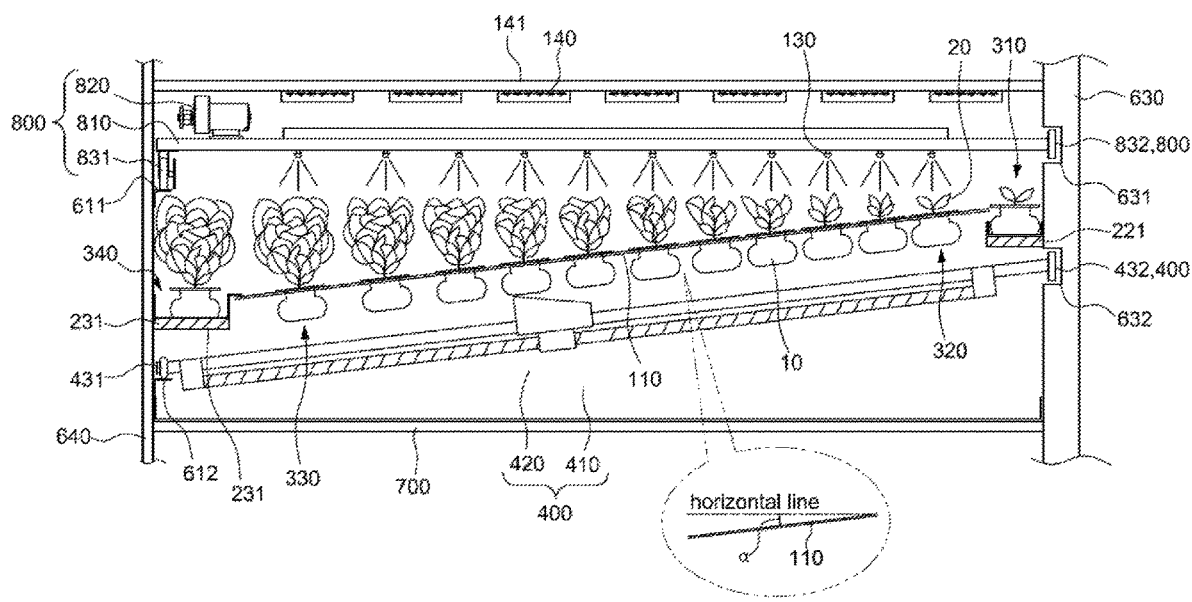
[FIG. 3]

[FIG.4]
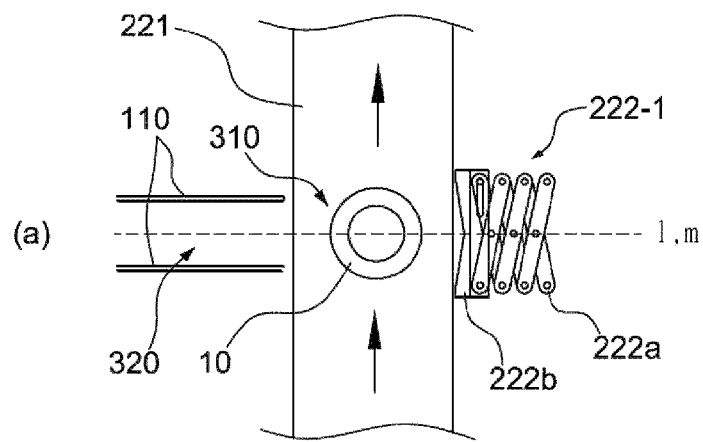
(a)
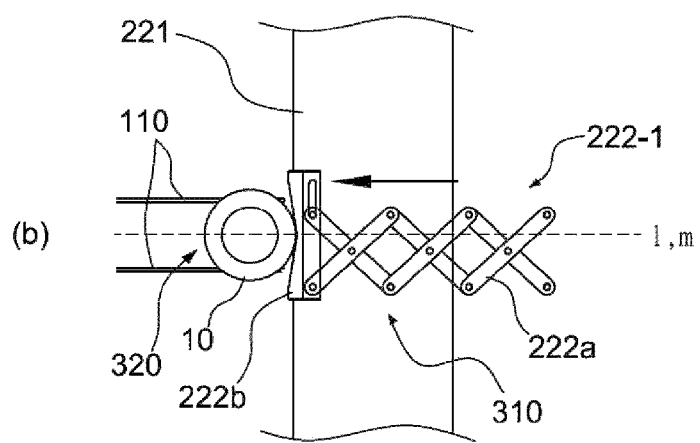
(b)

[FIG.5]
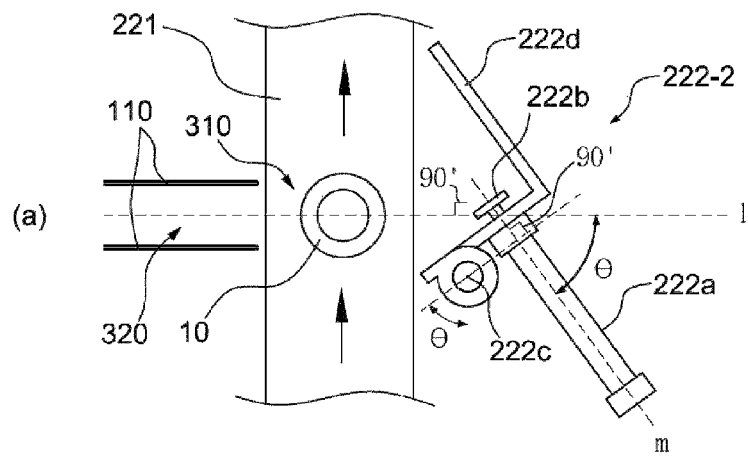
(a)
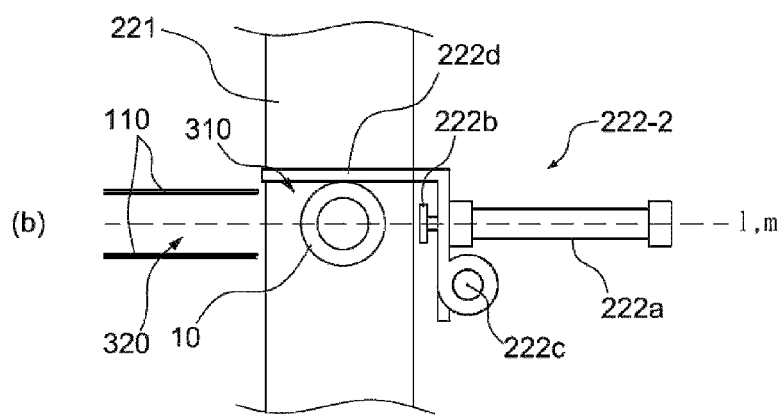
(b)
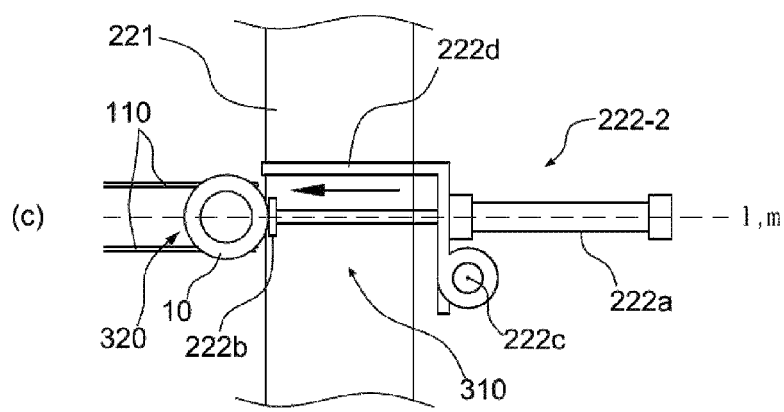
(c)

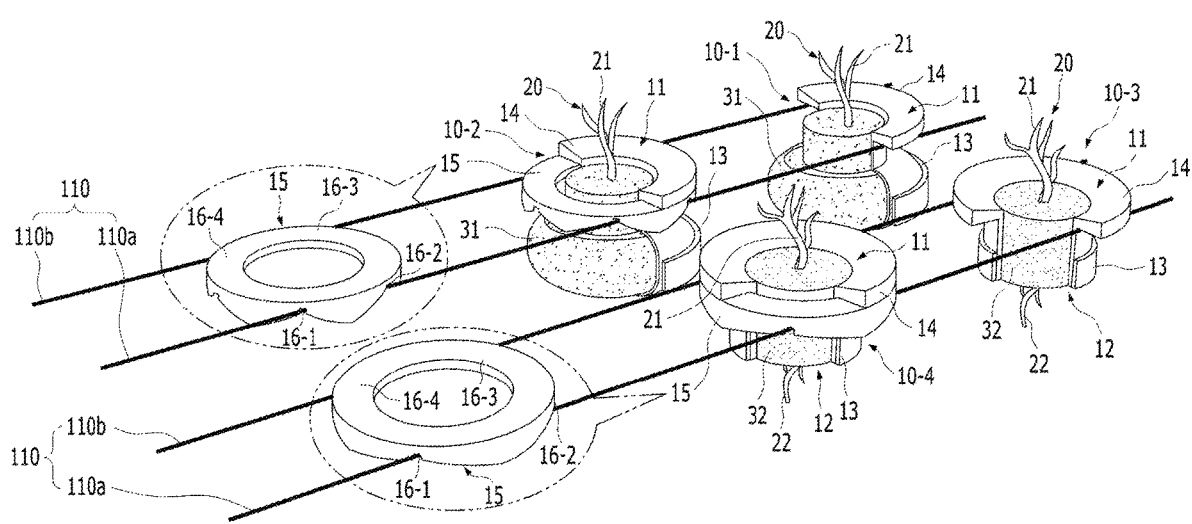
[FIG. 6]

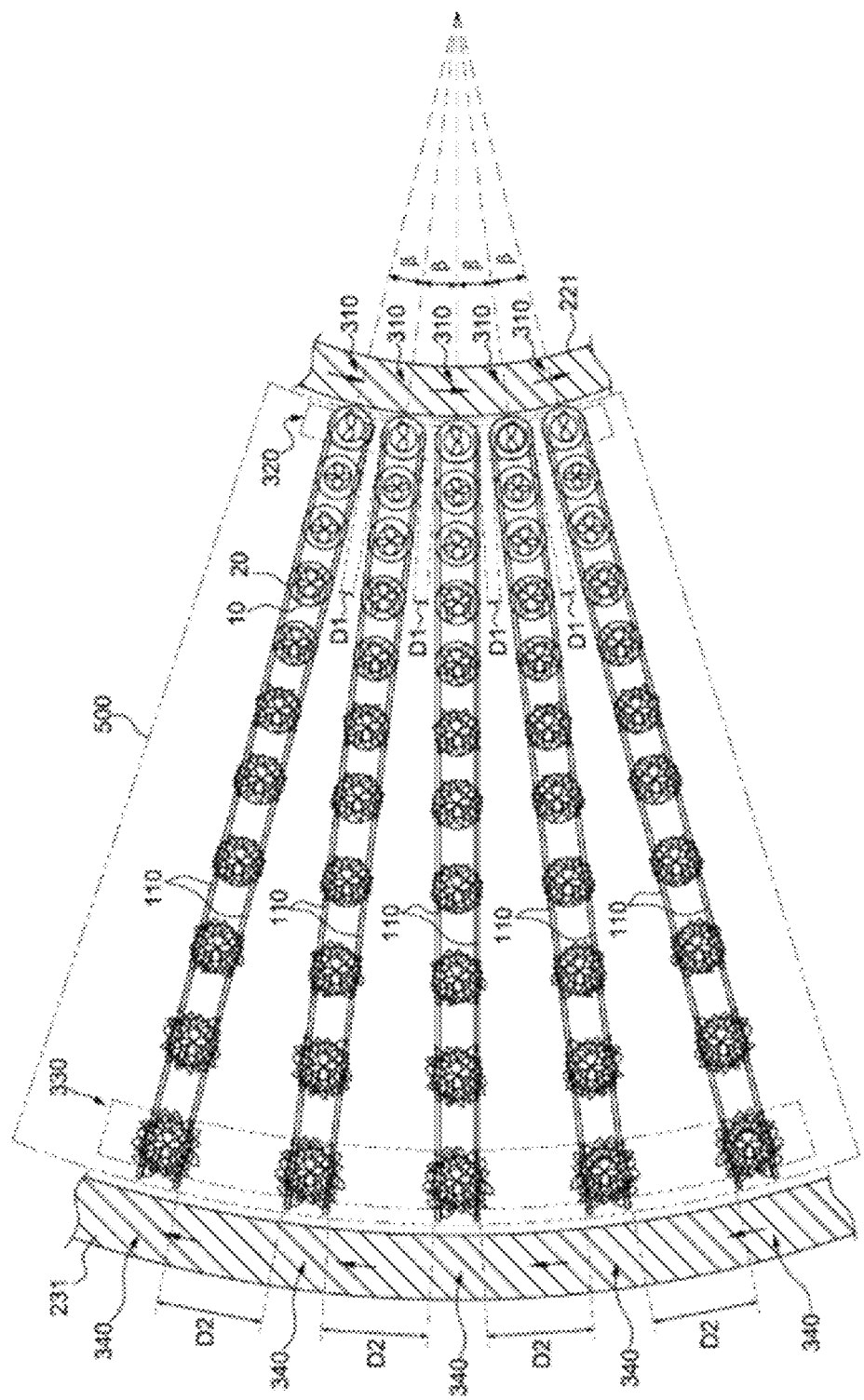
[FIG. 7]

[FIG.8]
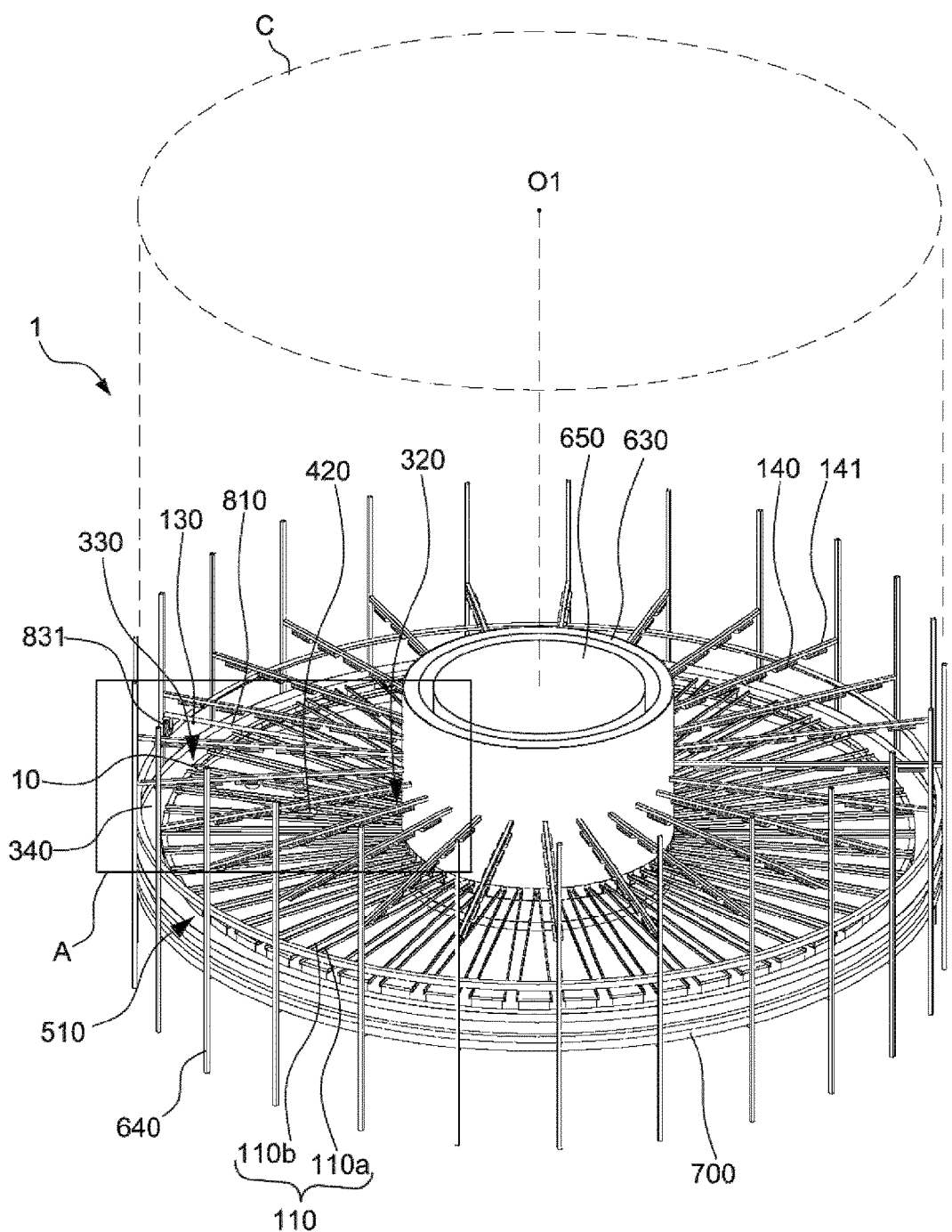

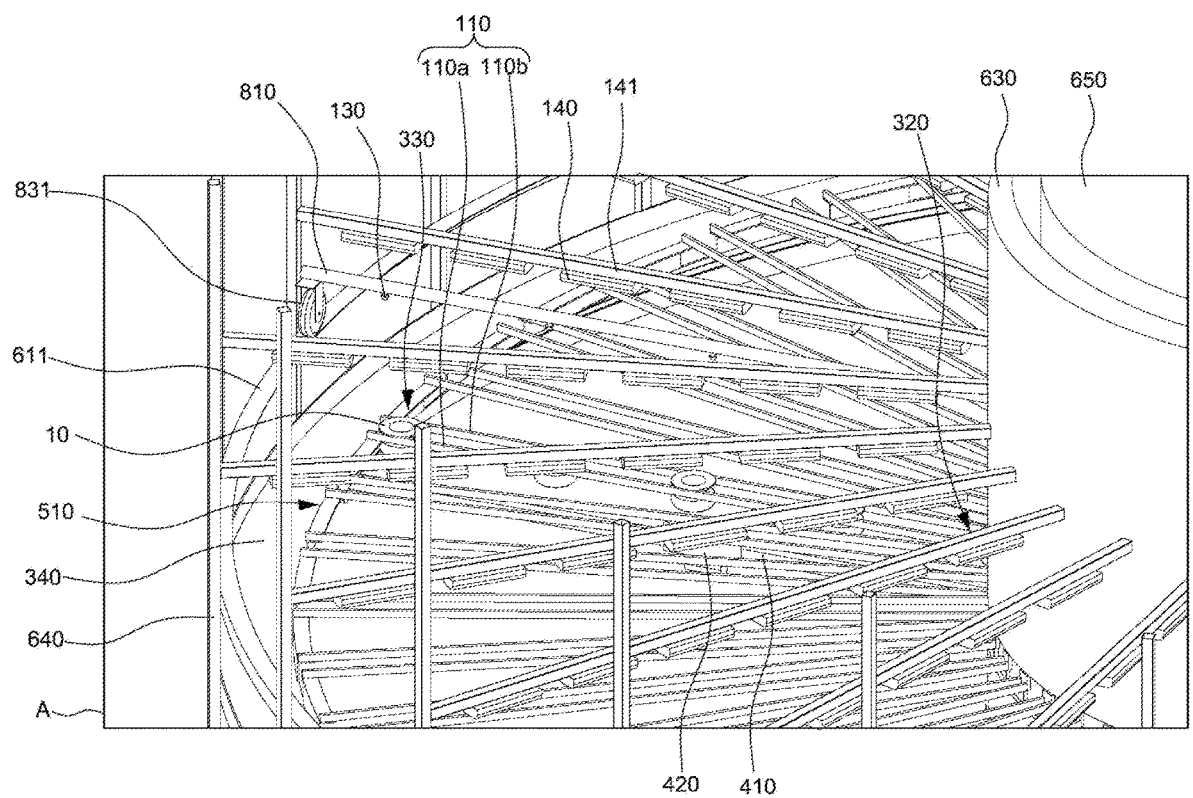
[FIG. 9]

[FIG.10]
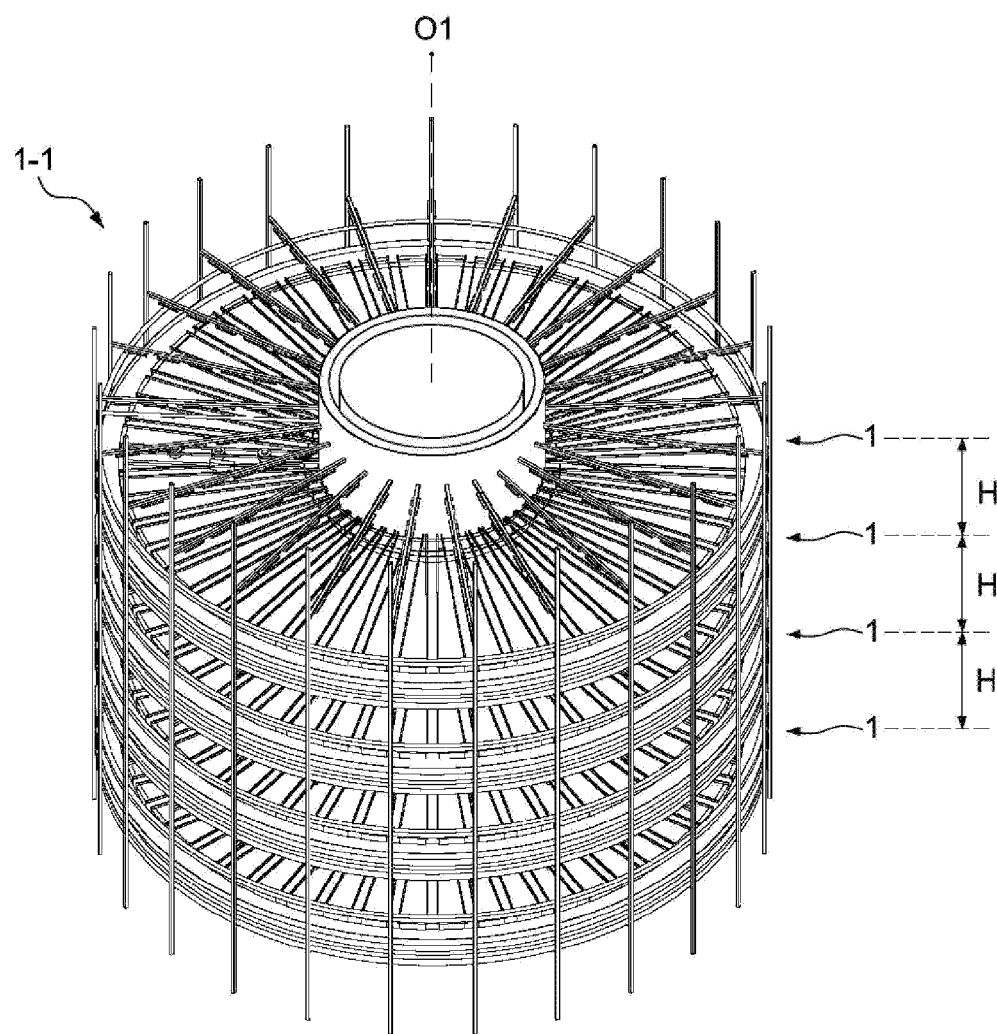

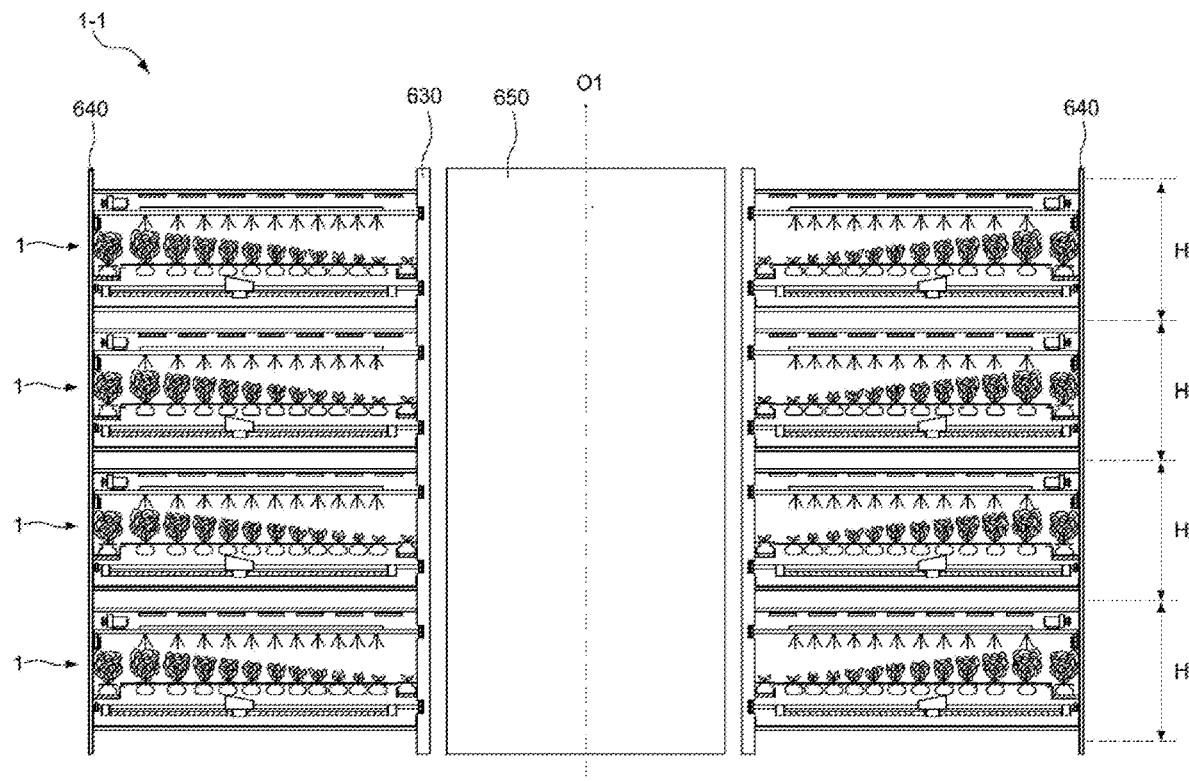
[FIG. 11]

[FIG.12]
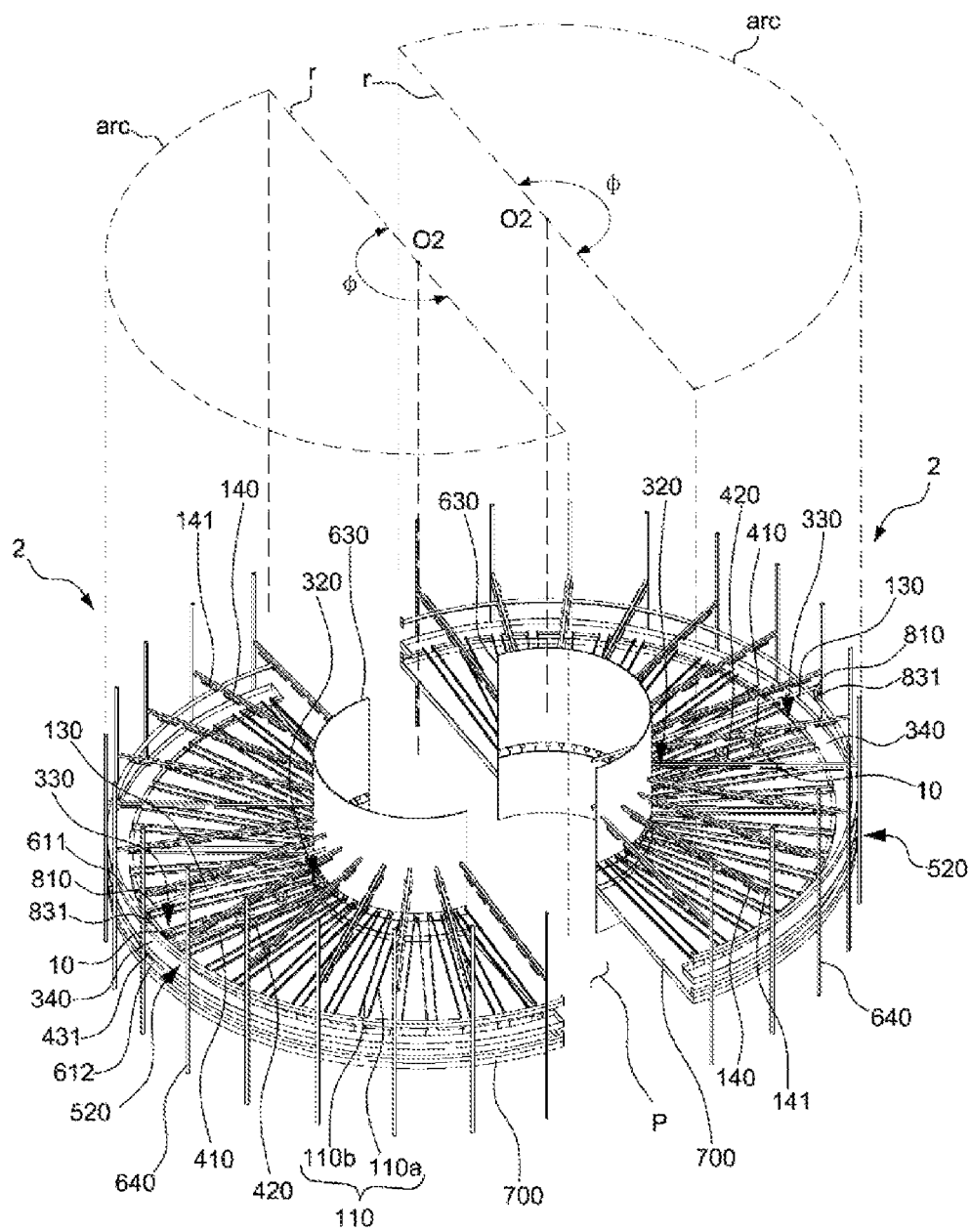

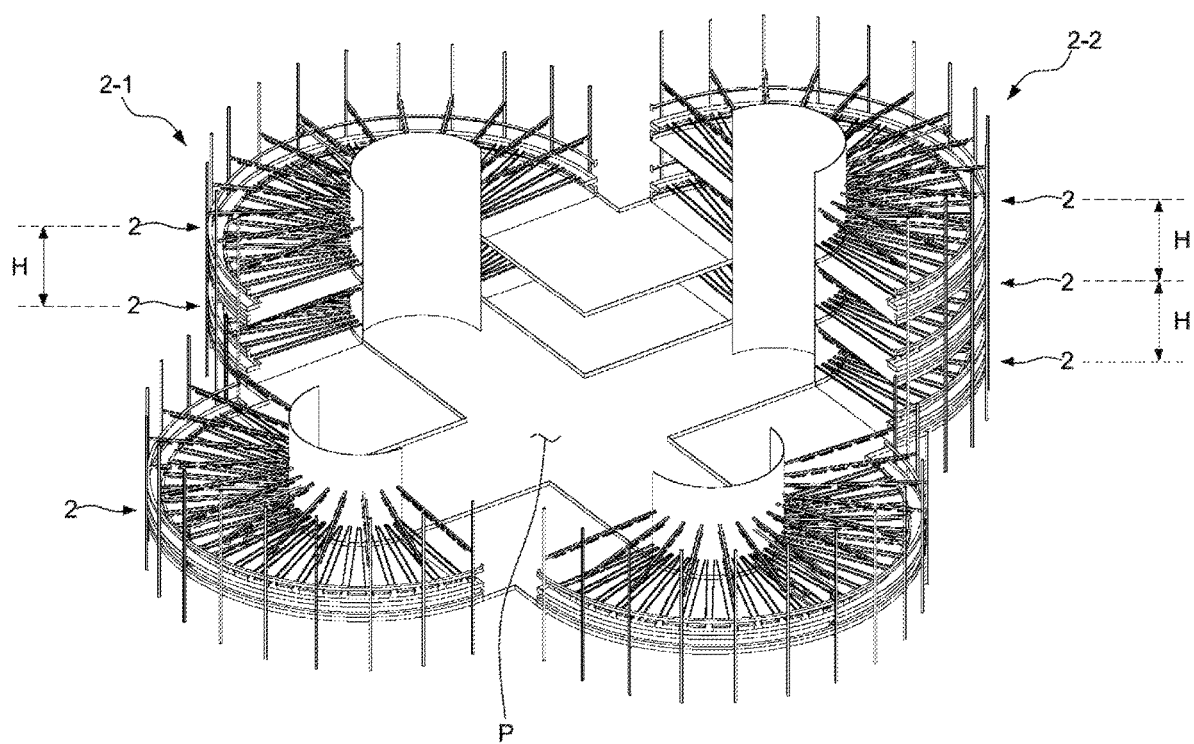
[FIG. 13]

[FIG.14]
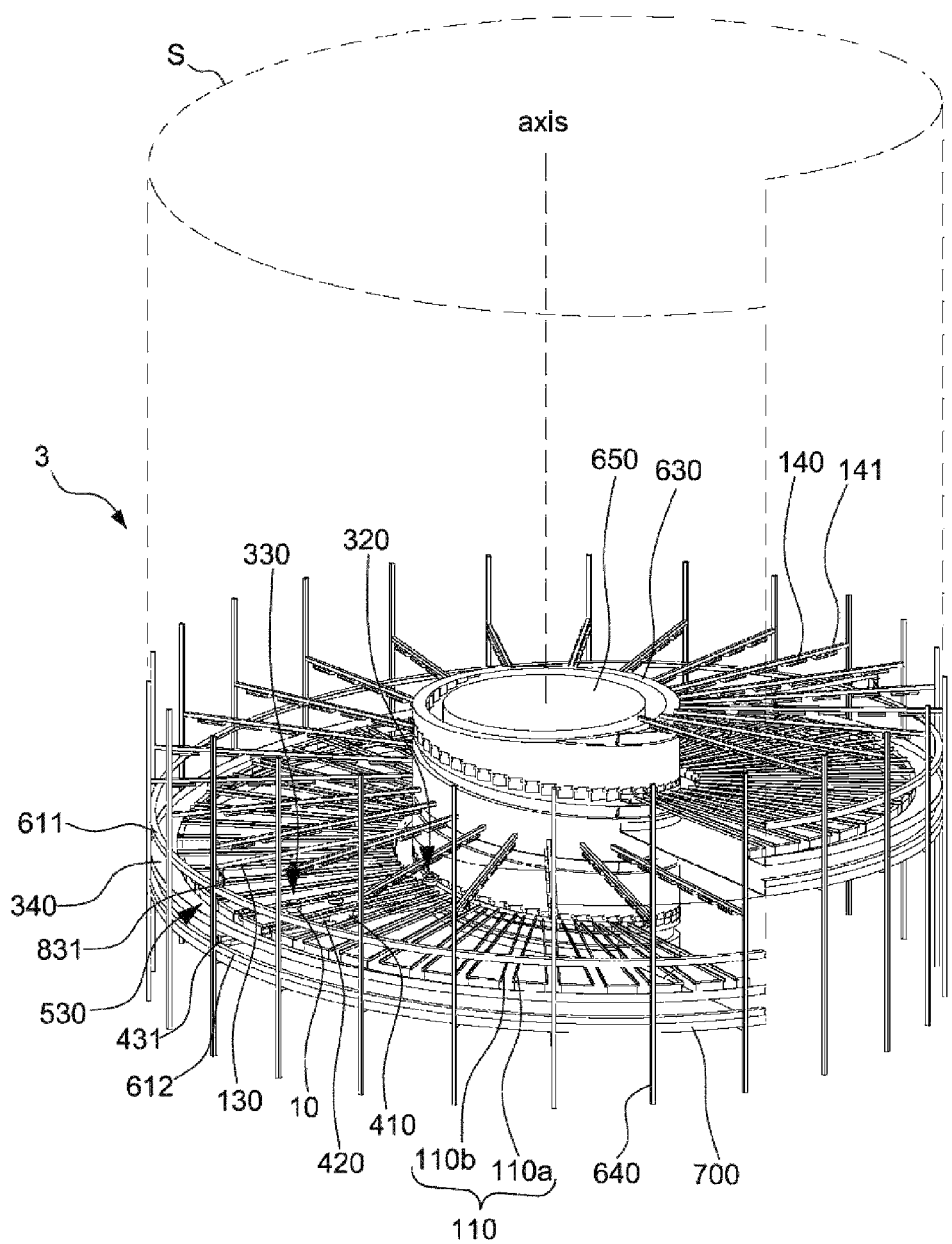

[FIG.15]
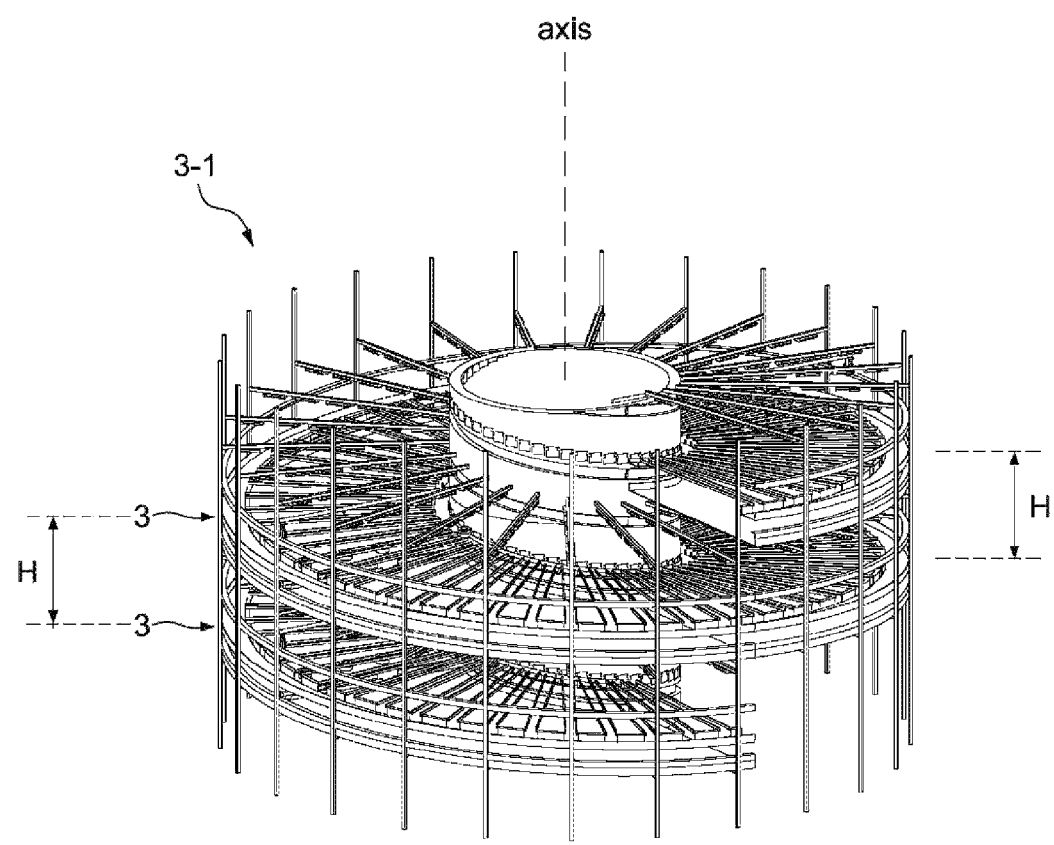

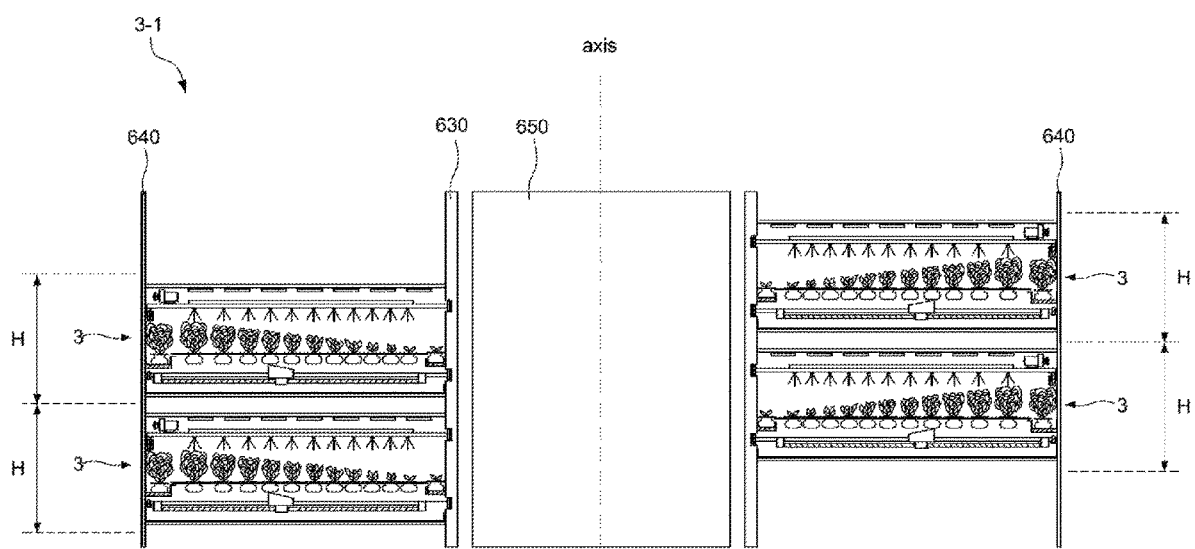
[FIG. 16]

[FIG.17]
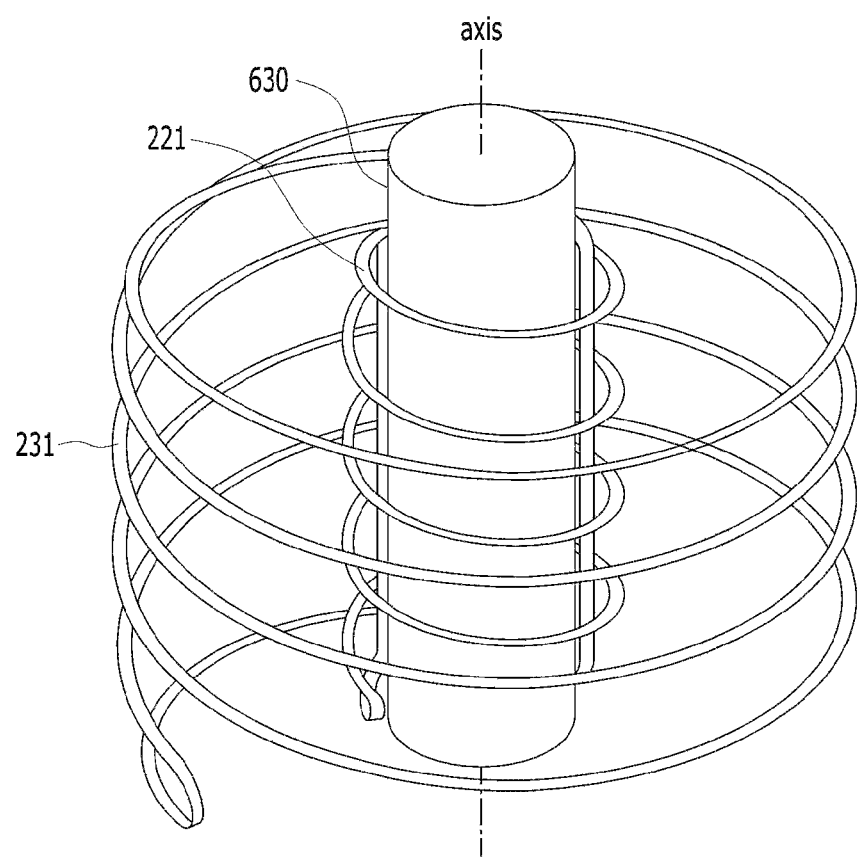

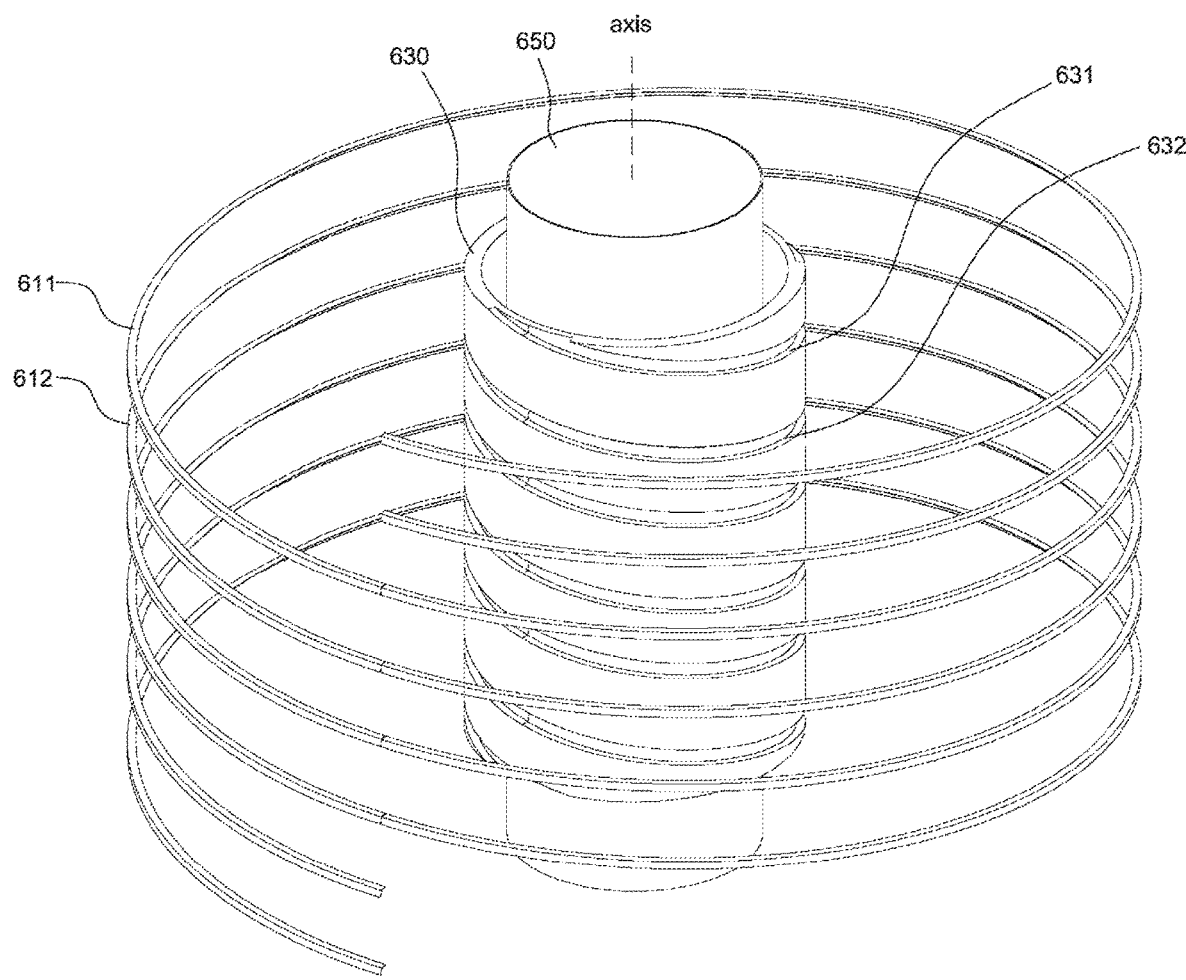
[FIG. 18]

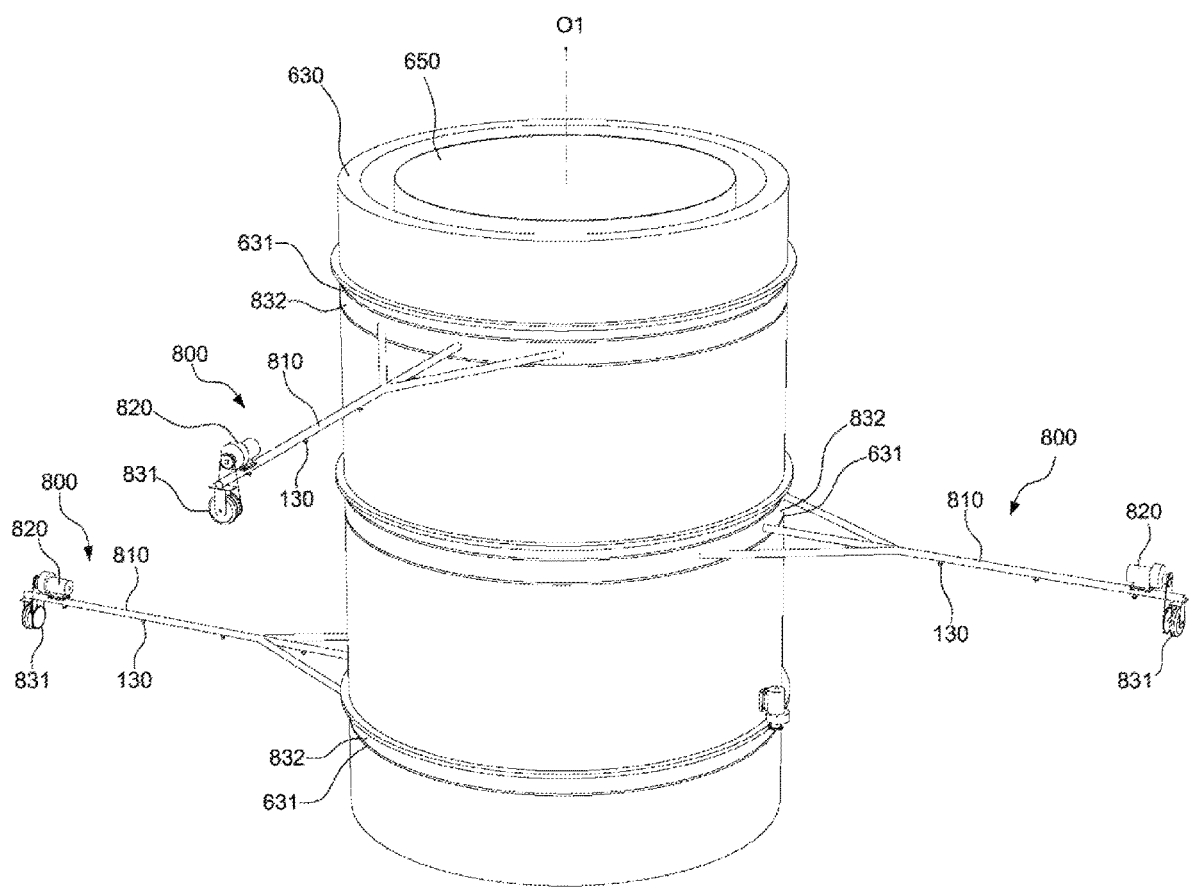
[FIG. 19]

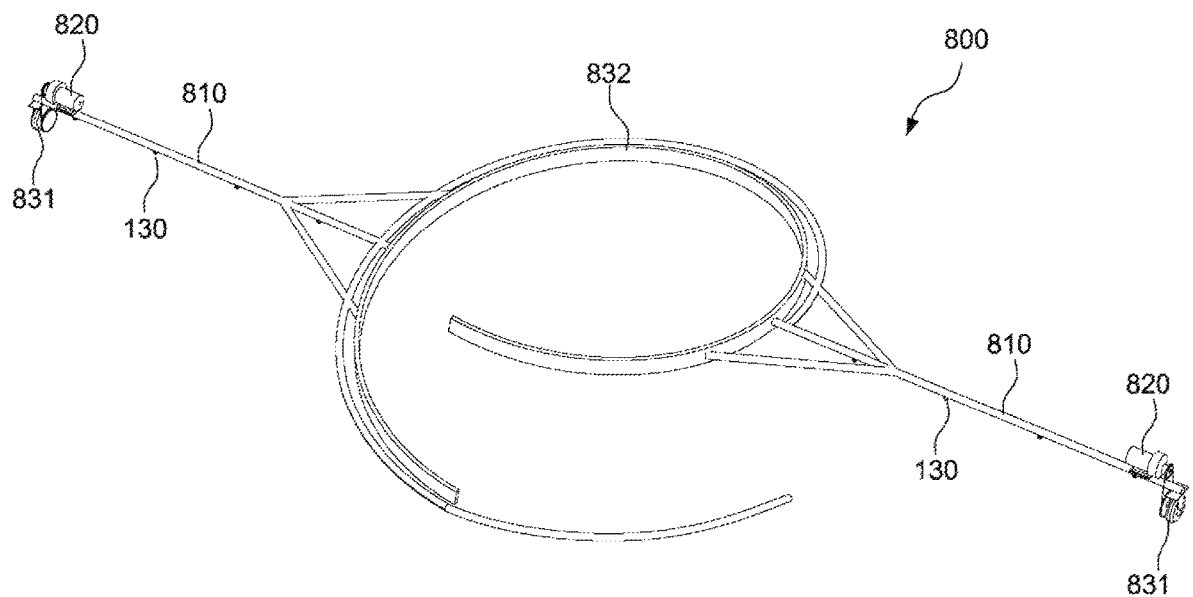
[FIG. 20]

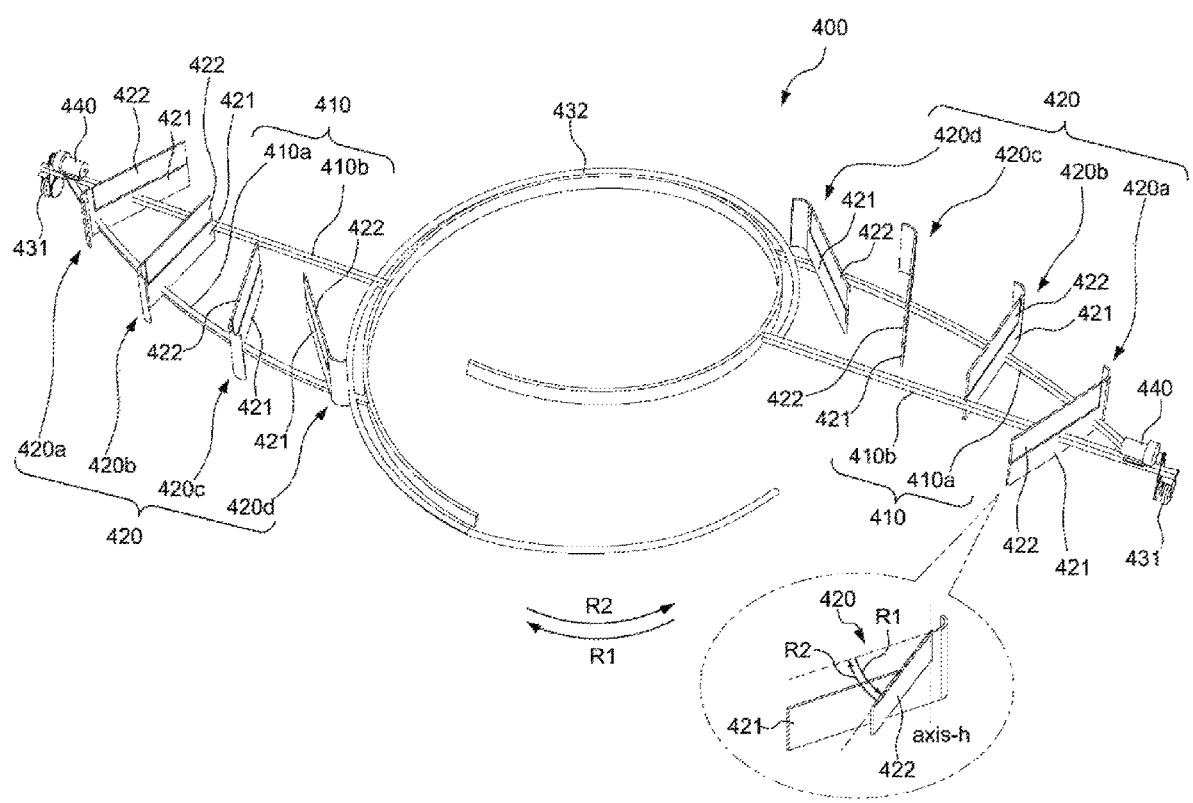
[FIG. 21]

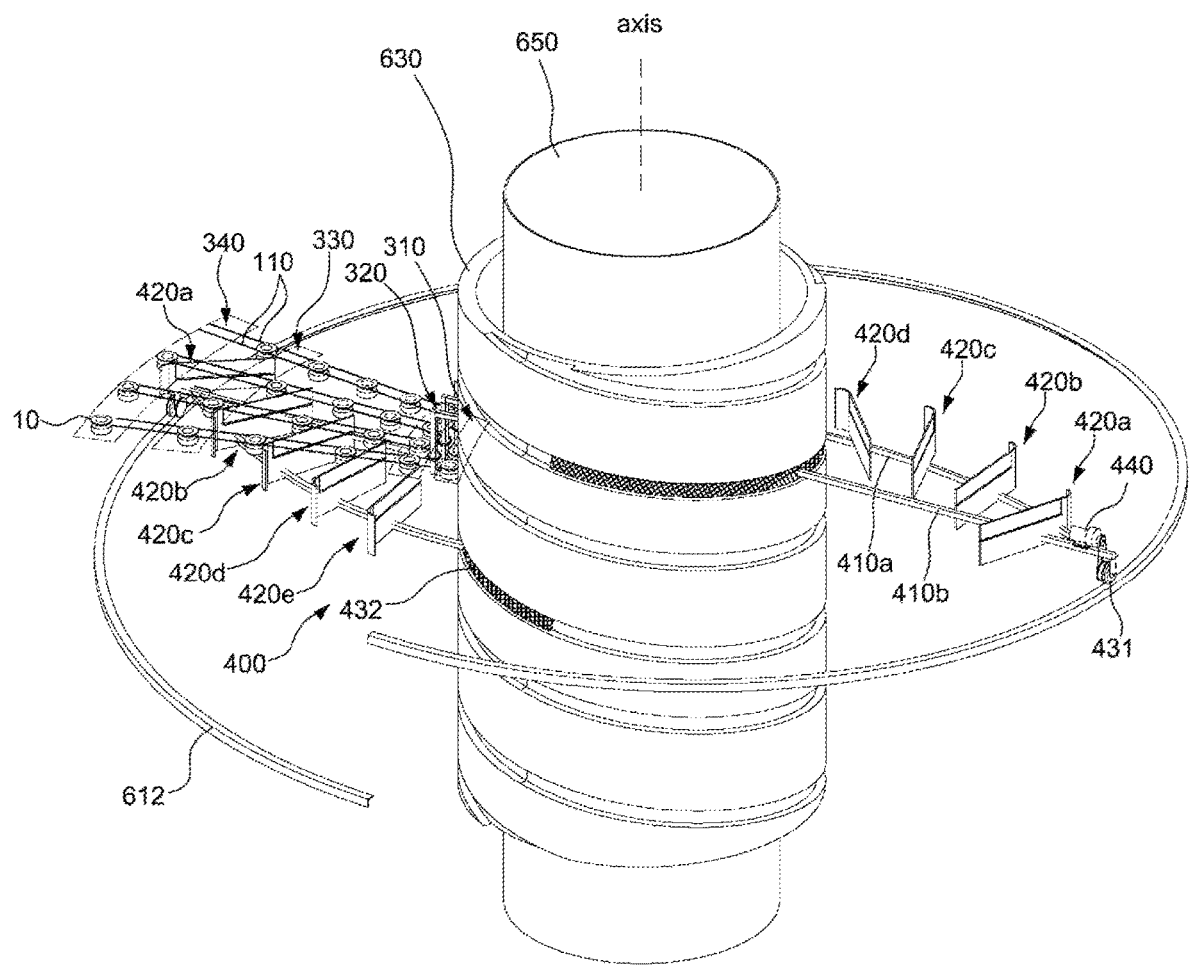
[FIG. 22]

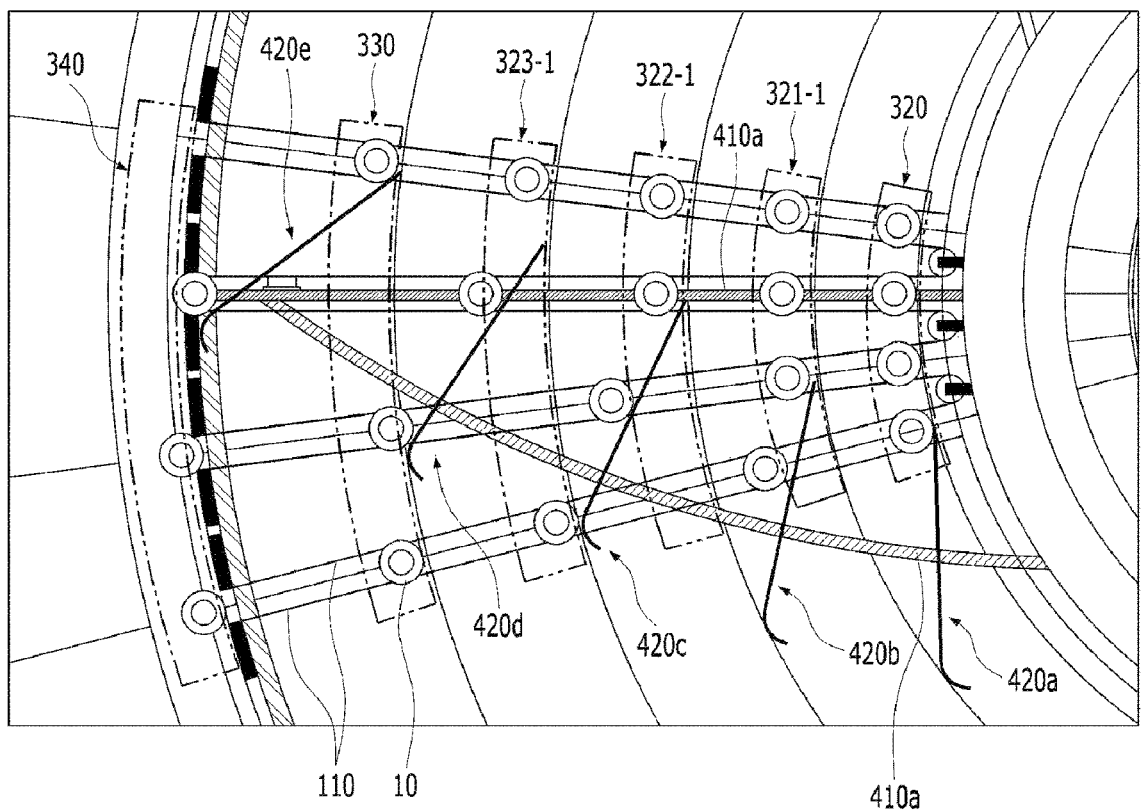
[FIG. 23]

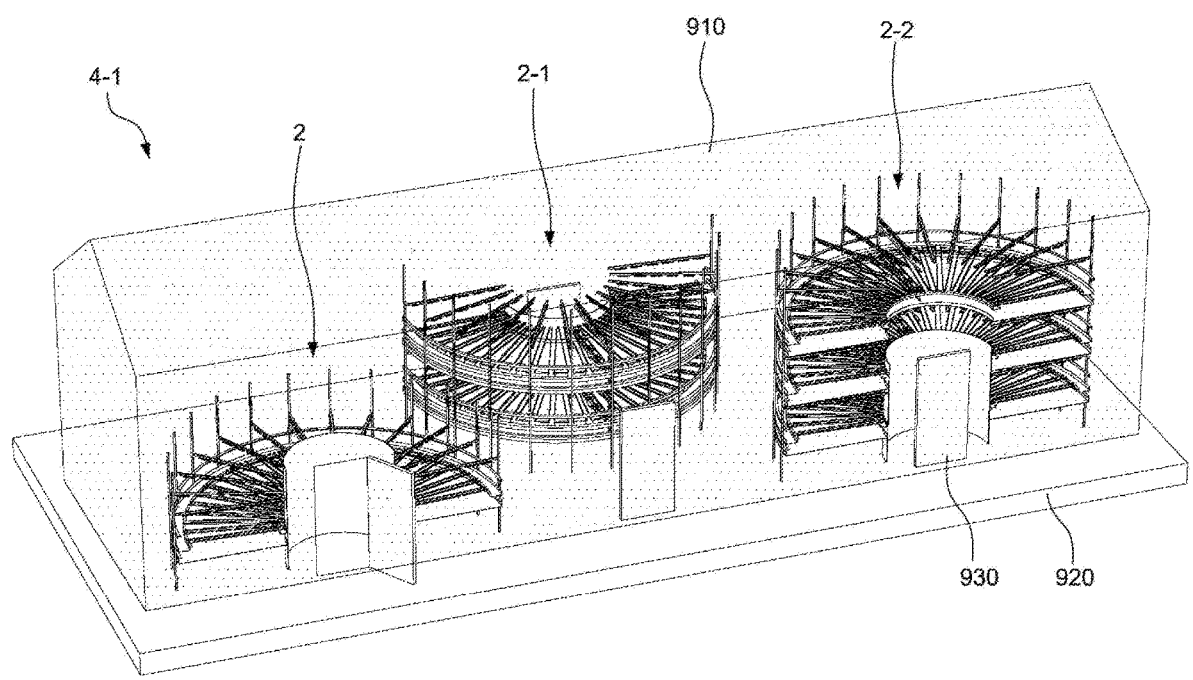
[FIG. 24]

[FIG.25]
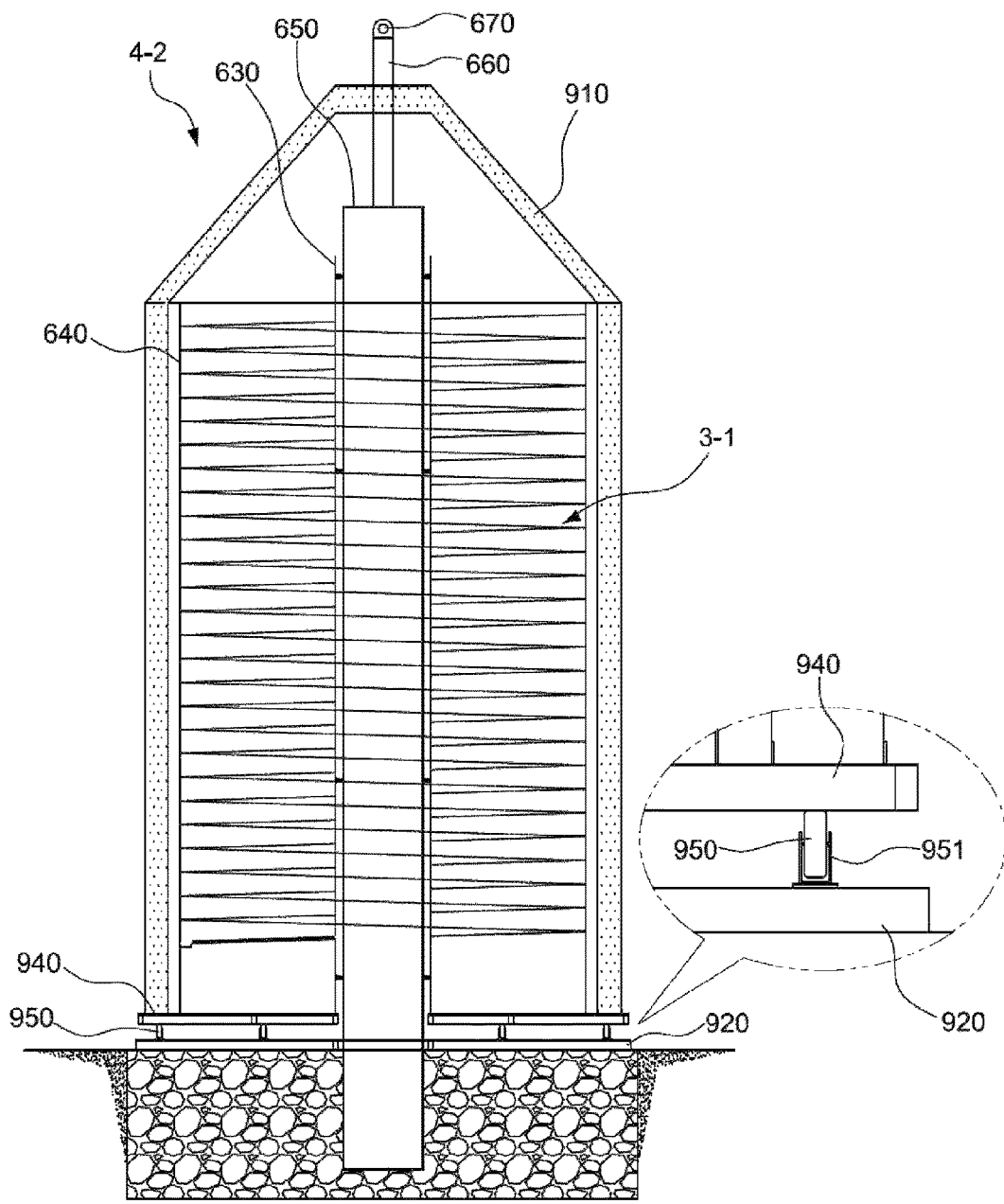

[FIG.26]
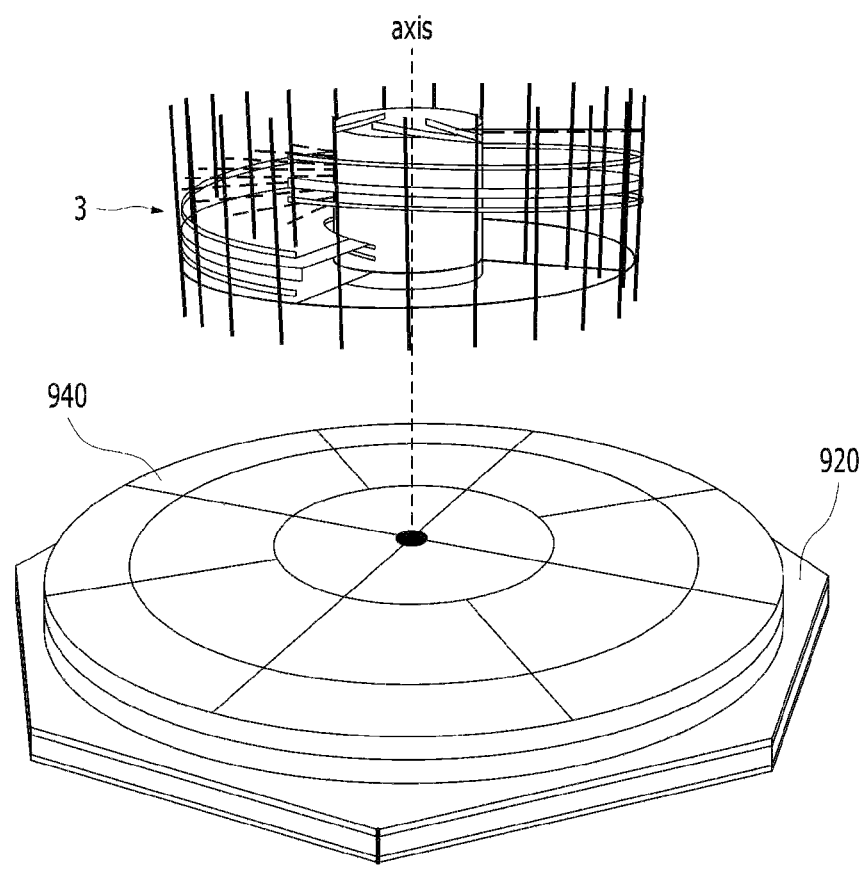

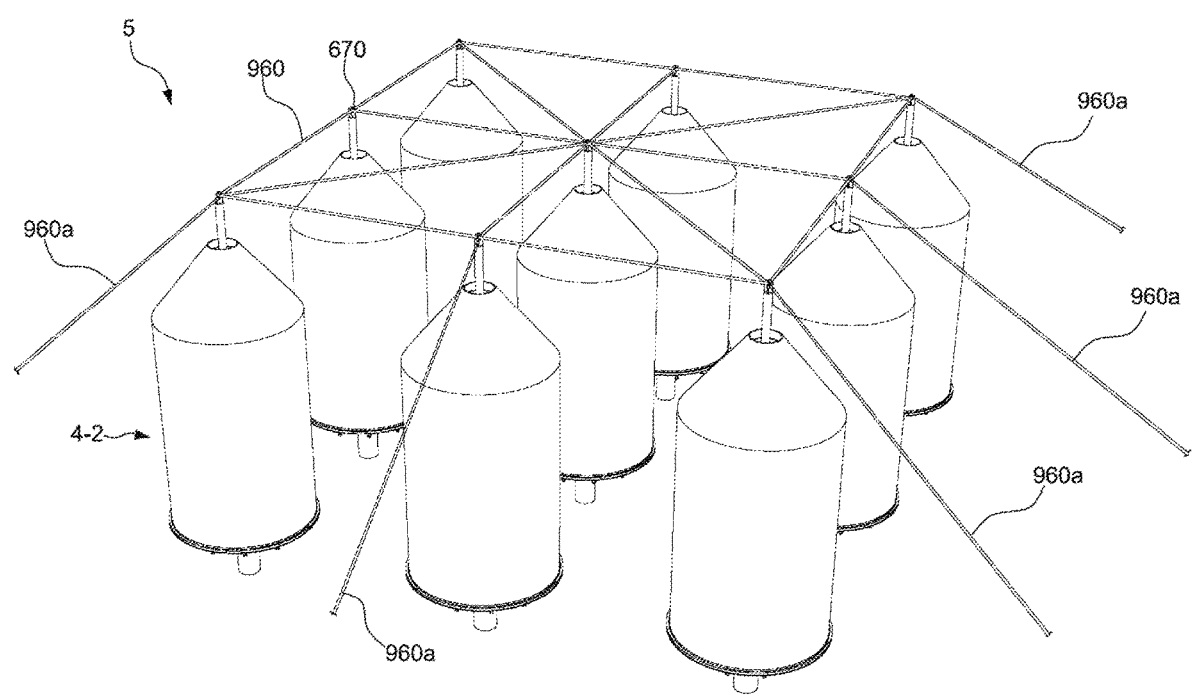
[FIG. 27]

PLANT CULTIVATION SYSTEM

CROSS-REFERENCE TO RELATED APPLICATIONS

This application is the U.S. National Phase under 35 U.S.C. § 371 of International Application No. PCT/KR2021/019007, filed on Dec. 14, 2021, which in turn claims the benefit of Korean Application No. 10-2021-0002705, filed on Jan. 8, 2021, the disclosures of which are incorporated by reference into the present application.

FIELD OF THE INVENTION

The present invention relates to a plant cultivation system, wherein each plant is sequentially transferred according to a growth step and continuously cultivated to obtain a continuous harvest.

BACKGROUND ART

In recent years, as technology has advanced and environmental concerns have arisen, research into cultivation systems for growing plants has accelerated.

In particular, there is an increasing interest in a plant cultivation system in the form of a factory, which is produced in large quantities in a cultivation environment in which plants are continuously and stably cultivated without being affected by nature, and research is being conducted in various ways to provide a more stable cultivation environment and increase production efficiency.

As an example of a plant cultivation system in the form of a factory, Korean Patent No. 10-2027660 is disclosed.

According to the above factory-type plant cultivation system, a cultivation area is set up where plants are planted and managed, and a predetermined amount of light, moisture, and other elements necessary for plant growth are supplied to the set cultivation area.

However, since plants typically occupy a larger space as they grow, there was a problem of inefficient space utilization by allocating a large space for future growth from the time they are seeds or small young plants.

Therefore, various methods were explored to increase space utilization by changing the spacing between the containers in which the plants are planted according to their growth stage.

In addition, in the process of cultivating plants, there is a growth period when the plants grow enough and a harvest period when the grown plants are harvested, so there was a problem that the expected benefits of harvesting plants, such as food supply and economic activities through sales, could not be obtained during the growth period.

Therefore, various methods have been explored to continuously take advantage of the benefits of harvesting plants by continuously harvesting a certain amount of the total cultivated plants at certain time intervals without distinguishing between the growth period and the harvest period.

DETAILED DESCRIPTION OF THE INVENTION

Technical Problem

An object of the present invention is to provide a plant cultivation system in which each plant is sequentially transferred according to a growth stage and continuously cultivated to obtain a continuous harvest.

Problem Solving Means

In order to achieve the above-described objective, a plant cultivation system of the present invention comprises at least one plant cultivation guide in which a plurality of containers planted with plants are arranged and supported, wherein the plant cultivation guide having a starting part positioned at a central part so that the container is loaded to begin growing plants, and a harvesting part positioned along a circumference of the central part so that plants are harvested, the containers are sequentially transported from the starting part to the harvesting part and continuously cultivated according to the growth stage of the planted plants.

In addition, in the plant cultivation guide, the plurality of containers are arranged at the same interval, or the plurality of containers are arranged at intervals gradually wider from the starting part toward the harvesting part according to the growth stage of the planted plants, so that a space having a size suitable for the growth step of the plants planted in each container is allocated.

In addition, it may further comprise a main transfer means for sequentially transporting the plurality of containers from the starting part to the harvesting part along the plant cultivation guide by rotating about an axis of the central part and contacting the plurality of containers and pushing the plurality of containers toward the harvesting part.

In addition, the plant cultivation guide includes a plurality of plant cultivation guides disposed to be adjacent in a horizontal direction, and a separation distance between neighboring plant cultivation guides is disposed to be widened from the starting part toward the harvesting part.

In addition, the plurality of plant cultivation guides form a circular guide surface in which the starting part provided in each plant cultivation guide is located at a central part of a circle, and the harvesting part provided in each plant cultivation guide is disposed along a circumference of the circle; or the plurality of plant cultivation guides form a fan-shaped guide surface in which the starting part provided in each plant cultivation guide is located at a central part of a circle, and the harvesting part provided in each plant cultivation guide is disposed an arc that is part of the circumference of the circle.

In addition, the plurality of plant cultivation guides form a spiral guide surface in which the starting part provided in each plant cultivation guide is located at an axial side of a spiral, and the harvesting part provided in each plant cultivation guide is formed along a spiral formed around an axis of the spiral.

In addition, a plurality of guide surfaces comprising the plurality of plant cultivation guides are formed, and the plurality of guide planes are stacked in a vertical direction at a set separation distance to form a multi-layered cultivation structure.

In addition, each plant cultivation guide is provided such that the vertical height of each plant cultivation guide gradually decreases from the starting part toward the harvesting part.

In addition, it may further comprise: a loading means for loading and settling the container in which the plant is planted into the starting part; and an unloading means for unloading the container positioned in the harvesting part.

In addition, the main transfer means is configured to transfer the container at predetermined time intervals according to the growth rate of plant planted in the container.

In addition, the main transfer means comprises: a transfer means guide that moves in a perpendicular direction with respect to a longitudinal direction of the plant cultivation guide by rotating about an axis of the central part, and is provided to cross the plant cultivation guide; and a plurality of push plates which are fixed to the transfer means guide and are in contact with the plurality of containers according to the movement of the transfer means guide to push and transfer the plurality of containers toward the harvesting part.

In addition, each of the plurality of push plates is provided such that a set cross angle is formed between the plurality of push plates and the plant cultivation guide.

In addition, the plurality of push plates are fixed to the transfer means guide at predetermined intervals so as to correspond to the positions of the plurality of containers supported by the respective plant cultivation guide, wherein a push plate corresponding to a container located closer to the harvesting part has a smaller cross angle formed between the push plate and the plant cultivation guide, or is configured to have a longer horizontal length, so that a container located closer to the harvesting part is configured to be transported a longer transport distance.

In addition, the plurality of push plates are configured to simultaneously transfer containers corresponding to the respect push plate while simultaneously crossing the plant cultivation guide when the transfer means guide moves, or the plurality of push plates are configured to sequentially cross with the plant cultivation guide, wherein the push plate corresponding to the containers located closer to the harvesting part are crossed first, and the containers located closer to the harvesting part are transferred in order.

In addition, the main transfer means is configured to perform a container transfer process wherein the transfer means guide moves in a set forward direction to transfer the plurality of containers supported on the plurality of plant cultivation guides by moving from one side of the plant cultivation guides to the other side, and then performs a return movement process wherein the transfer means guide moves in a set reverse direction to return to an original position by moving from the other side of the plant cultivation guides to the one side In addition, the push plate includes a fixed plate fixed to the transfer means guide, and a hinged plate hinge-connected to the fixed plate and configured to contact a container corresponding to the push plate by movement of the transfer means guide.

In addition, the hinge is a one-way hinge, wherein the hinge is configured such that when the hinged plate is subjected to a force in the reverse direction, the hinged plate is maintained in a closed state, and when the hinged plate is subjected to a force in the forward direction, the hinged plate is opened while rotating in the forward direction relative to a hinge shaft.

In addition, the fixed plate and the hinged plate are spring-connected with the hinge interposed therebetween, so that in the process of the return movement process, the hinged plate is pushed against each container to rotate and open in the forward direction, and then, as the contact with the container is terminated and the force exerted by the container disappears, the hinged plate is rotated and closed in the reverse direction by the restoring force of the spring.

In addition, at least one hanging part is provided on an outer side of the container, supported by the plant cultivation guide, and configured to support the container inward.

In addition, the plant cultivation guide comprises a pair of guides provided in parallel, and a plurality of hanging structures formed on one side and the other side of the hanging part are respectively supported on the pair of guides so that one side and the other side of the container are supported by the pair of plant cultivation guides.

In addition, the hanging part is configured to be separate from the container and configured to be rotatable in a state in which the container is supported inside the hanging part.

In addition, a friction part is provided on an outer side of the container at a position in contact with the push plate, and when the push plate is pushed against the container, the container is rotated in a predetermined direction by a friction force generated between the push plate and the friction part.

In addition, the container has a shape including a first opening through which the stems and leaves of the planted plant are exposed to the outside, and a second opening through which the roots of the planted plant are exposed to the outside.

In addition, the loading means comprises a loading implement means for transferring and settling the container located in the loading part to the starting part, and a loading transfer means for supporting the container and transferring the container from the outside to the loading part; the unloading means comprises an unloading implement means for transferring the container located in the harvesting part to an unloading part, and an unloading transfer means for supporting and transferring the container from the unloading part to the outside.

In addition, a supply material supply means for supplying at least one of the supply materials comprising water and nutrients to a plant planted in the plurality of containers is installed;

the supply material supply means is configured to move an upper side or a lower side of a guide surface formed of the plurality of plant cultivation guides and to supply at least one of the supply materials to plants planted in the plurality of containers respectively supported on the plurality of plant cultivation guides.

In addition, the supply material supply means is configured to supply the supply materials in a suitable manner according to the growth stage of the plant planted in the container.

In addition, it may further comprise: a lower boundary surface provided on a lower side of the guide surface comprising the plurality of plant cultivation guides, and stacking waste generated during a cultivation process of plants planted in a container supported on the guide surface; and a cleaning means for supplying fluid to sweep the waste accumulated on the lower boundary surface.

In addition, in the multi-layered cultivation structure, a layer boundary part for forming an independent cultivation environment in each layer is provided by blocking between neighboring guide surfaces.

In addition, there may also be provided a center column, which is a structure provided outside a starting part of the plurality of plant cultivation guides, is provided, and the plurality of plant cultivation guides are rotatable about the center column.

In addition, it may also comprise a house structure configured to block the outside and inside, and enclose the inside with the plurality of plant cultivation guides therein to create a cultivation environment of the plant planted in the container.

In addition, the plurality of plant cultivation systems comprising a plurality of plant cultivation systems including the plurality of plant cultivation guides and the house structure surrounding the plurality of plant cultivation guides are provided at regular intervals to form a collective cultivation complex, and wherein the collective cultivation complex is supported by interconnecting the plurality of plant cultivation systems, and wherein at least a portion of the interconnected plurality of plant cultivation systems is connected to the ground or an external fixture to be fixed in position.

Effects of the Invention

According to the plant cultivation system of the present invention, each plant is sequentially transferred according to a growth stage and continuously cultivated to obtain a continuous harvest.

In addition, depending on the growth stage of the plant, space utilization may be increased by changing an interval between the containers in which the plant is planted.

In addition, the present invention is provided with an automation system for efficiently cultivating plants, thereby reducing costs required for facilities compared to the same cultivation amount and increasing the efficiency of plant cultivation.

In addition, the present invention has a system in which artificial light and natural light are mixed and supplied, thereby reducing the costs required for providing plant cultivation facilities and increasing the efficiency of plant cultivation.

In addition, by rotating the plant cultivation system, natural light may be uniformly distributed to the plant, thereby increasing the efficiency of plant cultivation.

BRIEF DESCRIPTION OF THE DRAWINGS

FIG. 1 is a drawing of a plurality of containers supported on a plant cultivation guide according to the present invention.

FIG. 2 is a drawing of a plant cultivation system in which a plurality of containers are supported on a plant cultivation guide provided at a constant height according to the present invention.

FIG. 3 is a drawing of a plant cultivation system in which a plurality of containers are supported on a plant cultivation guide provided in an inclined shape according to the present invention.

FIG. 4 is a drawing illustrating one embodiment of a loading implement means according to the present invention.

FIG. 5 is a drawing illustrating another embodiment of the loading implement means of the present invention.

FIG. 6 is a drawing illustrating various embodiments of a container according to the present invention.

FIG. 7 is a drawing illustrating a plurality of plant cultivation guides disposed adjacent to each other to form a plant cultivation guide surface according to the present invention.

FIG. 8 is a perspective view of a circular plant cultivation system having a circular guide surface according to the present invention.

FIG. 9 is an enlarged view of a portion A shown in FIG. 8.

FIG. 10 is a perspective view of a circular multi-layered plant cultivation system having a plurality of circular guide surfaces stacked according to the present invention.

FIG. 11 is a vertical cross-sectional view of a circular multi-layered plant cultivation system according to the present invention.

FIG. 12 is a perspective view of a fan-shaped plant cultivation system having a fan-shaped guide surface according to the present invention.

FIG. 13 is a perspective view of a fan-shaped multi-layered plant cultivation system having a plurality of fan-shaped guide surfaces stacked according to the present invention.

FIG. 14 is a perspective view of a spiral plant cultivation system having a spiral guide surface according to the present invention.

FIG. 15 is a perspective view of a spiral multi-layered plant cultivation system with an extended spiral guide surface according to the present invention.

FIG. 16 is a vertical cross-sectional view of a spiral multi-layered plant cultivation system according to the present invention.

FIG. 17 is a drawing illustrating an embodiment of a loading transfer means and an unloading transfer means applied to a spiral multi-layered plant cultivation system according to the present invention.

FIG. 18 is a drawing illustrating an embodiment of a first roller guide and a supply means support groove and a second roller guide and a transport means support groove applied to a spiral multi-layered plant cultivation system according to the present invention.

FIG. 19 is a drawing illustrating an embodiment of a supply material transfer means applied to a circular multi-layered plant cultivation system according to the present invention.

FIG. 20 is a drawing illustrating an embodiment of a supply material transfer means applied to a spiral multi-layered plant cultivation system according to the present invention.

FIG. 21 is a drawing illustrating an embodiment of a main transfer means applied to a spiral multi-layered plant cultivation system according to the present invent ion.

FIG. 22 is a drawing illustrating an embodiment in which a container supported on a plant cultivation guide is transferred by the main transfer means applied to a spiral multi-layered plant cultivation system according to the present invention.

FIG. 23 is a more detailed drawing of an embodiment in which a container supported on a plant cultivation guide is transferred by the main transfer means according to the present invention.

FIG. 24 is a drawing illustrating an embodiment of a fixed house type plant cultivation system in which a house structure having a rectangular wall structure according to the present invention is installed.

FIG. 25 is a drawing illustrating an embodiment of a rotary house-type plant cultivation system in which a house structure of a cylindrical wall structure according to the present invention is installed.

FIG. 26 is a drawing illustrating an embodiment in which a rotary house-type plant cultivation system is formed by coupling a rotatable plant cultivation system to the upper side of a lower boundary part according to the present invention.

FIG. 27 is a drawing in which a plurality of house plant cultivation systems according to the present invention are provided to form a cultivation complex, a plurality of plant cultivation systems are interconnected by a connection member, and a plant cultivation system at the edge is fixed to a fixture such as the ground by a fixing member.

DESCRIPTION OF THE SIGN

1: Circular plant cultivation system
1-1: Circular multi-layered plant cultivation system
2: Fan-shaped plant cultivation system
2-1: Fan-shaped multi-layered plant cultivation system
3: Spiral plant cultivation system
3-1: Spiral multi-layered plant cultivation system
4-1: Fixed house type plant cultivation system
4-2: Rotating house type plant cultivation system
5: Cultivation complex 10: Container
13: Friction part 15: hanging part
20: Plant 110: Plant cultivation guide
130: Supply material supply means 140: Light source
221: Loading transfer means 231: Unloading transfer means
222-1,222-2: Loading implement means 222a: Stretchable part
222b: Pushing part 222c: Rotary shaft
222d: Movement prevention guide 310: Loading part
320: Starting part 321 to 329: Cultivation position
321-1: First cultivation position 322-1: Second cultivation position
323-1: Third cultivation position 330: Harvesting part
340: Unloading part 400: Main transfer means
410: Transfer means guide 420: Push plate
421: Fixed plate 422: Hinged plate
431: Second roller 432: Transfer means support member
500,510,520,530: Plant cultivation guide surface
510: Circular guide surface 520: Fan-shaped guide surface
530: Spiral guide surface 611: First roller guide
612: Second roller guide 630: Starting part side support column
631: Supply means support groove 632: Transfer means support groove
640: Harvesting part side support column 650: Center column
660: Connecting column 670: Connecting part
700: Lower boundary surface 800: Supply material transfer means
810: Supply means guide
820: Supply material transfer means driving part
832: Supply means support member 910: House structure
920: Bottom part 940: bottom boundary part
950: Floor roller 960: Connecting member
960a: Fixing member

Best Form for Implementation of the Invention

Hereinafter, the configuration and operation of the preferred embodiment of the present invention will be described in detail with reference to the accompanying drawings.

Referring now to FIGS. 1 through 3, a plant cultivation system according to one embodiment of the present invention includes a plant cultivation guide (110) supported by a plurality of containers (10) in which plants (20) are planted, wherein the plant cultivation guide (110) has a starting part (320) wherein the containers (10) are loaded and cultivation of the plants (20) begins, and a harvesting part (330) wherein the plants (20) are harvested, and wherein each container (10) is sequentially transferred from the starting part (320) to the harvesting part (330) and continuously cultivated according to the growth stage of the planted plants (20).

In FIG. 1, there is schematically illustrated a view of the plant cultivation guide (110) on which the plurality of containers (10) are supported from an upper side in a vertical direction, and in FIGS. 2 and 3, there is schematically illustrated a view of the plant cultivation system from one side in a horizontal direction.

Various types of plants (20) may be planted and grown in the container (10), and the plant cultivation system provides a suitable growing environment according to the type of plant (20) planted in the container (10).

Harvesting of the plants (20) planted in the container (10) may be performed in the form of unloading of the container (10) supported on the harvesting part (330), and may include a process of collecting all or a part of the plant (20) planted in the unloaded container (10) according to a cultivation purpose.

The plant cultivation guide (110) may comprise a straight structure, as shown in the drawings, connecting from the starting part (320) to the harvesting part (330) in a straight line. Alternatively, although not shown in the drawings, the plant cultivation guide (110) may comprise a curved structure extending from the starting part (320) to the harvesting part (330).

The plant cultivation guide (110) may include a pair of guides (110a,110b) in parallel, as shown in the drawings, such that one side and the other side of the container (10) are supported on the pair of guides (110a,110b). Furthermore, although not shown in the drawings, the plant cultivation guide (110) may be configured in a plate shape supporting a bottom surface of the container (10).

The plant cultivation guide (110) may be configured to provide a constant height parallel to a horizontal line, as shown in FIG. 2, to provide a more stable support for the plurality of containers (10).

Furthermore, the plant cultivation guide (110) may be provided in a form inclined at a certain angle (a) from a plane parallel to a horizontal line, as shown in FIG. 3, and in particular so as to gradually decrease in vertical height from the starting part (320) towards the harvesting part (330).

According to the above-mentioned sloped structure of the plant cultivation guide (110), natural light incident from the outside may be more evenly distributed on the plants (20) planted in the plurality of containers (10) supported on the plant cultivation guide (110).

In FIG. 3, it is assumed that the natural light incident from the outside is incident obliquely from the upper left side to the lower right side of the plant cultivation guide (110).

In the above case, natural light is incident at an angle from the harvesting part (330) toward the starting part (320).

In other words, the plants (20) grow gradually as they move toward the harvesting part (330), and since the angle of incidence of sunlight is oblique in most regions except the equatorial region, the plant cultivation guide (110) with the above-mentioned inclined structure can form similar heights of the plants (20) planted in the plurality of containers (10), thereby minimizing the occurrence of plants being shaded by neighboring plants and ensuring that an even supply of natural light is provided to each plant, thereby increasing the efficiency of plant cultivation.

Accordingly, the tilt angle (a) of the plant cultivation guide (110) may be adjusted according to the growth aspect of the plants (20) planted in the plurality of containers (10) supported on the plant cultivation guide (110), and may preferably be formed at 30 degrees or less.

The plurality of containers (10) may be sequentially arranged in a line on the plant cultivation guide (110), and may be disposed at set arrangement positions (320,321,322, 323,324,325,326,327,328,329,330) with set arrangement intervals (d1,d2,d3,d4,d5,d6,d7,d8,d9,d10).

The set arrangement positions (320, 321, 322, 323, 324, 325, 326, 327, 328, 329, 330) comprise a starting part (320) and a harvesting part (330), and at least one cultivation positions (321, 322, 323, 324, 325, 326, 327, 328, 329) between the starting part (320) and the harvesting part (330).

The plurality of containers (10) are sequentially loaded into the starting part (320), sequentially transferred to the at least one cultivation positions (321, 322, 323, 324, 325, 326, 327, 328, 329) as the planted plants (20) grow, and sequentially unloaded at the harvesting part (330).

Accordingly, the plants (20) planted in the plurality of containers (10) is continuously cultivated.

In the time that the plant (20) loaded on the container (10) is loaded into the starting part (320), the plants (20) planted in the container (10) may be in various growth stages according to the type and purpose of use of the corresponding plant (20).

For example, the container (10) that is loaded into the starting part (320) may be a plant (20) that has been planted when the seed has germinated and emerged leaves, or it may be a plant (20) that has grown to a predetermined size.

The container (10) may be transferred at predetermined time intervals according to the growth rate of the planted plants (20).

For example, in the case of lettuce with a fast growth rate, it may be transferred at daily intervals and set to be harvested daily from the harvesting part (330).

The plant (20) planted in the container (10) gradually grows and occupies a larger space as the container (10) is transferred from the starting part (320) to the harvesting part (330).

Accordingly, by adjusting the arrangement intervals (d1, d2,d3,d4,d5,d6,d7,d8,d9,d10), it is possible to allocate a space of a size suitable for the growth stage of the plants (20) planted in the container (10) located at the starting part (320) and at each of the cultivation positions (321,322,323,324, 325,326,327,328,329) and at the harvesting part (330), interference between neighboring plants (20) can be prevented, thereby further improving the quality of the harvested plants (20), and space can be used more efficiently.

The arrangement intervals (d1,d2,d3,d4,d5,d6,d7,d8,d9, d10) may be set to gradually widen from the right side of the drawing, i.e., the starting part (320) side, to the left side of the drawing, i.e., the harvesting part (330) side, and each arrangement intervals (d1,d2,d3,d4,d5,d6,d7,d8,d9,d10) may be set to a different value. That is, it may be set to have a gradually large value in the order of d1,d2,d3,d4,d5,d6, d7,d8,d9,d10.

Furthermore, although not shown in the figure, a trend is formed in which the arrangement interval between the plurality of containers (10) gradually widens from the side of the starting part (320) to the side of the harvesting part (330), but two or more neighboring arrangement interval may be set to the same value. For example, referring to FIG. 3, d2, d3, and d4 are set to the same value, d5, d6, and d7 are set to the same value, d8, d9, and d10 are set to the same value, and may be set a gradually large value in the order of d1, d2, d5, d8, and d11.

The arrangement intervals (d1,d2,d3,d4,d5,d6,d7,d8,d9, d10) may be adjusted depending on the size of the plant cultivation guide (110), the number of containers (10) supported simultaneously on the plant cultivation guide (110), and the area of space expected to be occupied by plants planted in the containers (10) according to the growth step.

The plant cultivation system may be configured to allow a worker to manually transfer the container (10) to load the container (10) on the starting part (320), or manually transfer and unload the container (10) located in the harvesting part (330).

Further, the plant cultivation system may further include a loading means for transferring the container (10) and loading the container (10) to the starting part (320), and an unloading means for unloading the container (10) positioned in the harvesting part (330).

The loading means may include a loading implement means (222-1, see FIG. 4; 222-2, see FIG. 5) for loading and settling the container (10) located in the loading part (310) into the starting part (320), and a loading transfer means (221) for supporting and transferring the container (10) to the loading part (310) from the outside.

The loading part (310) may be provided close to the starting part (320), and may be provided at a position facing the outside of the starting part (320).

The loading transfer means (221) may be a conveyor belt connecting to the loading part (310) from the outside, and may support the container (10) to move from the outside to the loading part (310) by driving of a loading transfer means drive part (not shown).

The loading transfer means drive part may be configured to drive the loading transfer means (221) at a constant speed regardless of the loading of the container (10) by the loading implement means, or may be configured to temporarily stop driving the loading transfer means (221) while the container (10) is being transferred from the loading part (310) to the starting part (320) by the loading implement means so that the loading of the container (10) is carried out stably.

The loading implement means may be configured to apply a pushing force to the container (10) supported on the loading part (310) toward the starting part (320), thereby pushing the container (10) toward the starting part (320).

In addition, the loading implement means may be configured to support and lift the container (10) supported on the loading part (310) and then transfer the container (10) to the starting part (320) to be seated.

The unloading implement means may be configured as part of the main transfer means (400) for transferring the container (10), or may be provided as a separate configuration from the main transfer means (400), as described in the following description of FIGS. 4 and 5.

The unloading means may include an unloading implement means (not shown) for unloading the container (10) located in the harvesting part (330) to an unloading part (340), and an unloading transfer means (231) for supporting the container (10) transferred to the unloading part (340) and transferring the container (10) to the outside.

The unloading part (340) may be provided close to the harvesting part (330), and may be provided at a position facing the outside of the harvesting part (330).

The unloading transfer means (231) may be a conveyor belt connected to the unloading part (340) from the outside, and configured to support the container (10) and transfer the container (10) in an unloading transfer direction (UL) from the unloading part (340) to the outside according to driving of an unloading transfer means drive part (not shown).

The loading transfer direction (L) and the unloading transfer direction (UL) may be set in the same direction as shown in the drawings, or may be set in different directions.

The unloading transfer means drive part may be configured to drive the unloading transfer means (231) at a constant speed regardless of the unloading of the container (10) by the unloading implement means, or may be configured to temporarily stop the drive of the unloading transfer means (231) while the container (10) is being transferred from the harvesting part (330) to the unloading part (340) by the unloading implement means so that the unloading of the container (10) is carried out stably.

The unloading implement means may comprise applying a pushing force to the container (10) supported on the harvesting part (330) to push the container (10) towards the unloading part (340).

In addition, the unloading implement means may be configured to support and lift the container (10) supported on the harvesting part (330) and transfer the container (10) to the harvesting part (330) to be seated.

The unloading implement means may be configured as part of the main transfer means (400) for transferring the container (10), as described in the following description of FIGS. 21 to 23, or may be provided as a separate configuration from the main transfer means (400).

The unloading process in which the container (10) supported on the harvesting part (330) is unloaded by the unloading means, the container transfer process in which the plurality of containers (10) supported on the plant cultivation guide (110) is transferred towards the harvesting part (330), and the loading process in which the new container is loaded into the starting part (320) by the loading means, may be performed simultaneously.

In addition, the unloading process, the container transfer process, and the loading process may be sequentially performed.

Further, the plant cultivation system may include at least one light source (140) for illuminating artificial light to the plants (20) planted in the plurality of containers (10) supported by the plant cultivation guide (110).

The light source (140) may be configured to irradiate light suitable for the growth of the plants (20) planted in the plurality of containers (10), such as infrared, ultraviolet, or visible light, and for example, may be configured as an LED light.

The light source (140) may be provided on the upper side of the plurality of containers (10) supported on the plant cultivation guide (110), as shown in the drawings, to irradiate light downwardly so that light is provided in the form of direct sunlight to the plants (20) planted in each container (10).

For this purpose, an upper side of the plant cultivation guide (110) may be provided with a light source support (141) on which the light source (140) is supported, in parallel with the plant cultivation guide (110).

Additionally, although not shown in the drawings, the light source (140) may be positioned to provide light in the form of reflected light to the plants (20) planted therein.

The light source (140) may be configured to provide an appropriate amount of artificial light in an appropriate form depending on the type of plant (20) planted in the container (10), and may vary the form of light provided at predetermined time intervals to appropriately aid the growth of the plant (20).

For example, if the container (10) is planted with ginseng, which is a shade plant, the light source (140) may be set to irradiate with a weak light of 5,000 lux to 15,000 lux, and may be set to provide light for 12 hours of the day, and to stop providing light for the other 12 hours.

Furthermore, the light source (140) may irradiate light in a form appropriate to the growth stage of the plants (20) planted in the plurality of containers (10) supported on the plant cultivation guide (110), respectively.

For example, the light source (140) may be configured to irradiate gradually stronger light from the starting part (320) to the harvesting part (330).

Additionally, the light source (140) may be supplied to the plants (20) planted in the plurality of containers (10), in addition to natural light incident from outside the plant cultivation system.

In this case, the light source (140) may vary the form of light supply according to weather and season to appropriately assist the growth of the corresponding plant (20).

For example, the total amount of light supplied to the plants (20) planted in the plurality of containers (10) can be adjusted appropriately by adjusting to provide weaker light from the light source (140) during summer or sunny days when the intensity of natural light is high, and by adjusting to provide stronger light from the light source (140) during winter or cloudy days when the intensity of natural light is low.

Furthermore, the plant cultivation system may be provided with a supply material supply means (130) for supplying at least one of a plurality of supply materials including water and nutrient solution to plants (20) planted in the plurality of containers (10) supported on the plant cultivation guide (110).

The supply material supply means (130) may be configured to have different supply material supply means, such as a water supply means (not shown) for supplying water and a nutrient solution supply means (not shown) for supplying the nutrient solution, or it may be configured to supply a mixed supply material of water and nutrient solution.

The supply material supply means (130) may be provided with a small tank (not shown) for storing and supplying the supply material, and may be piped to an external tank (not shown) and configured to draw the supply material from the external tank.

The supply material supply means (130) may be provided at an upper side of the plurality of containers (10) supported on the plant cultivation guide (110), as shown in the drawings, to spray the supply material downwardly, thereby supplying the supply material through the upper first opening (11) of each container (10) (see FIG. 6).

Additionally, although not shown in the drawings, the plurality of containers (10) may be configured to supply the supply material through a lower second opening (12) (see FIG. 6) of the containers (10) by spraying the supply material upwardly.

The supply material supply means (130) may vary the form of supply of the supply material at predetermined time intervals to appropriately aid the growth of the plant (20), and may supply the appropriate kind of the supply material in the appropriate amount according to the type of plant (20) planted in the container (10) to appropriately aid the growth of the plant (20).

The supply material supply means (130) may be provided in plurality to evenly supply the plants (20) planted in the plurality of containers (10) supported on the plant cultivation guide (110).

Furthermore, the supply material supply means (130) may supply the supply material in a manner appropriate to the growth stage of the plants (20) planted in the plurality of containers (10) supported on the plant cultivation guide (110), respectively.

For example, the supply material supply means (130) may be configured to supply increasing a large amount of the supply material from the starting part (320) to the harvesting part (330).

To this end, the supply material supply means (130) may be provided at positions corresponding to positions of the plurality of containers (10) supported on the plant cultivation guide (110).

Further, the supply material supply means (130) may be movable, and a supply material transfer means (800) may be provided for transferring the supply material supply means (130).

The supply material transfer means (800) may include a supply means guide (810) supporting the supply material supply means (130), a first roller (831) provided at an end of the supply means guide (810), and a supply material transfer means driving part (820) to drive the first roller (831) to move the supply means guide (810).

In addition, a first roller guide (611) supporting the first roller (831) and providing a moving path may be provided to move the first roller (831) along the first roller guide (611).

The first roller guide (611) may be provided with rails (not shown) for setting a movement path for the first roller (831).

The first roller guide (611) may extend in a direction perpendicular to the ground direction of FIGS. 2 and 3, thereby allowing the first roller (831) to move along the first roller guide (611) and allowing the supply material supply means (130) to move in a direction perpendicular to the ground direction of FIGS. 2 and 3.

According to the supply material transfer means (800), the supply material supply means (130) may be configured to move between a plurality of the plant cultivation guide (110) to sequentially supply the supply material to plants (10) planted in a plurality of containers (10) supported on each plant cultivation guide (110).

In addition, the plant cultivation system may be provided with a main transfer means (400) that performs the container transfer process by sequentially transferring the plurality of containers (10) supported on the plant cultivation guide (110) from the starting part (320) to the harvesting part (330).

The main transfer means (400) is driven by a drive of the main transfer means drive part (not shown), and will transfer the container (10) at a predetermined time interval according to the growth rate of the plants (20) planted in the container (10).

The main transfer means (400) may be configured to convey the plurality of containers (10) supported on the plant cultivation guide (110) one after the other, or may be configured to convey them simultaneously.

The main transfer means (400) may be operated in conjunction with the loading transfer means and the unloading transfer means so that the loading process, the container transfer process and the unloading process are carried out systematically.

The main transfer means (400) may be configured, as shown in the drawings, to be located at the lower end of the plant cultivation guide (110), and to push the container (10) along the plant cultivation guide (110) toward the harvesting part (330).

The main transfer means (400) may include at least one push plate (420) for pushing the container (10) supported on the plant cultivation guide (110), a transfer means guide (410) for supporting and transferring the push plate (420), a second roller (431) provided at an end of the transfer means guide (410), and a main transfer means drive part (not shown) for driving the second roller (431).

In addition, a second roller guide (612) supporting the second roller (431) and providing a moving path may be provided to move the second roller (431) along the second roller guide (612).

The second roller guide (612) may be provided with rails (not shown) for setting a movement path for the second roller (431).

Additionally, the main transfer means (400) may be configured to lift and transfer the container (10) supported on the plant cultivation guide (110), although this is not shown in the drawings.

In addition, each of the outer side of the start part (320) and the outer side of the harvesting part (330) of the plant cultivation guide (110) may be provided with the plant cultivation guide (110), the loading transfer means, the unloading transfer means, the main transfer means (400), the light source support (141), a starting part side support column (630) having a vertical support structure for supporting the supply material transfer means (800), and a harvesting part side support column (640).

Further, the supply means guide (810) may be positioned vertically with the plant cultivation guide (110), wherein the first roller (831) is provided at the harvesting part (330) of the supply means guide (810), the first roller guide (611) is supported on the harvesting part side support column (640), and the starting part (320) of the supply means guide (810) is movably supported on the start part side support column (630).

To this end, a supply means support member (832) may be provided at an end of the starting part (320) of the supply means guide (810), and a supply means support groove (631) in which the supply means support member (832) is supported may be formed in the start part side support column (630).

Further, the second roller (431) may be provided at an end of the harvesting part (330) of the transfer means guide (410), the second roller guide (612) may be supported on the harvesting part side support column (640), and an end of the starting part (320) of the transfer means guide (410) may be movably supported on the start part side support column (630).

To this end, a transfer means support member (432) may be provided at an end of the starting part (320) of the transfer means guide (410), and a transfer means support groove (632) in which the transfer means support member (432) is supported may be formed in the start part side support column (630).

In addition, a lower boundary surface (700) on which waste is generated during a cultivation process of the plant (20) planted in the container (10) supported by the corresponding plant cultivation guide (110) may be provided below the plant cultivation guide (110).

The lower boundary surface (700) may be made of a waterproof material.

In addition, although not shown in the drawings, a cleaning means (not shown) for supplying a fluid so as to sweep a waste accumulated on the lower boundary surface (700) in a predetermined direction, and a waste discharge part connected to the outside from the lower boundary surface (700) to discharge the waste to the outside by the cleaning means may be further provided.

The lower boundary surface (700) may be supported on the start part side support column (630) and the harvesting part side support column (640).

In addition, although not shown in the drawings, the plant cultivation system may further comprise an air conditioning device including a blower (not shown) communicating with the outside for ventilation.

In addition, although not shown in the figures, the plant cultivation system may be further equipped with an observation camera (not shown) for observing the condition of the plants (20) cultivated by the plant cultivation system and checking whether any abnormalities occur.

FIGS. 4 and 5 illustrate one embodiment and another embodiment of the above loading implement means.

Referring to FIG. 4, the loading implement means (222-1) of an embodiment of the present invention may be configured to be stretchably moved along a straight stretch line (M) by actuation of the loading means drive part (not shown), which is located on the opposite side of the starting part (320) with the loading part (310) interposed therebetween.

The loading implement means (222-1) extends to push the container (10) located at the loading part (310) and transfer it to the starting part (320), and then contracts to return to its original position and repeats the extension movement.

(a) of FIG. 4 illustrates an operational state in which the loading implement means (222-1) is retracted and exists in a standby mode.

In (b) of FIG. 4, an actuation state is shown in which the loading implement means (222-1) extends and pushes the container (10) located at the loading part (310) toward the starting portion (320).

At this time, the transfer path by which the container (10) is pushed by the loading implement means (222-1) and transferred to the starting portion (320) is formed on a loading line (L) connecting the corresponding starting part (320) and the loading part (310), and the loading line (L) and the stretch line (M) may be formed in a straight line.

The loading implement means (222-1) may include a stretchable part (222a) configured to stretch as described above, and a pushing part (222b) provided at a portion of the stretchable part (222a) in contact with the container (10) to transmit the stretching force of the stretchable part (222a) to the container (10).

The stretchable part (222a) may, for example, comprise a foldable structure with a plurality of links connected to each other, as shown in the drawings.

The stretchable part (222a) of the foldable structure may be configured to be folded, retracted, and stretched according to the driving of the loading implement means drive.

The stretchable part (222a) may comprise a material with a lower hardness than the container (10), or a material with elasticity, to cushion the impact caused by a collision between the loading implement means (222-1) and the container (10). For example, the stretchable part (222a) may include a resinous material.

In addition, the pushing part (222b) may comprise a recessed shape on the side facing the container (10), such that the container (10) is pushed by the loading implement means (222-1) to minimize position deviation and shaking of the container (10) while a transfer is being performed, and to enable more stable transfer.

In addition, referring to FIG. 5, the loading implement means (222-2) according to another embodiment of the present invention follows the loading implement means (222-1) of FIG. 4, but is configured to rotate about a rotary shaft (222c) provided on one side, and is further provided with a movement prevention guide (222d) to block the movement path of the container (10) being transferred by the loading transfer means (221).

The loading implement means (222-2) rotates about the rotary shaft (222c) by a predetermined rotation angle (θ) to block the movement of the container (10) by the loading transfer means (221) by positioning the movement prevention guide (222d) in a loading position across the loading part (310) (see (b) and (c) of FIG. 5), and then rotates about the rotation angle (θ) in the opposite direction to return to its original position, the standby position, and repeats the rotational drive.

In (a) of FIG. 5, a first actuation state is illustrated in which the loading implement means (222-2) is in a standby position. At this time, the loading implement means (222-2) are in a retracted state.

(b) of FIG. 5 shows a second actuation state in which the loading implement means (222-2) are positioned in the loading position to block the container (10) located in the loading part (310) from being transferred along the loading transfer means (221), and in which the stretchable part (222a) is in a retracted state.

In (c) of FIG. 5, a third actuation state is shown in which the loading implement means (222-2) are positioned in the loading position, and the stretchable part (222a) is extended to push the container (10) located in the loading part (310) toward the starting part (320).

When the container (10) is loaded, the loading implement means (222-2) rotates counterclockwise by the rotation angle (θ) from the first actuated state (see (a) of FIG. 5) to the second actuated state (see (b) of FIG. 5) to constrain the position of the container (10) to remain in the loading part (310), the stretchable part (222a) extends and transitions to the third actuation state (see (c) of FIG. 5), thereby loading the container (10) into the starting part (320).

In addition, when the container (10) is loaded into the starting part (320), it may transition from the third driving state (see (c) of FIG. 5) to the second driving state (see (b) of FIG. 5) and back to the first driving state (see (a) of FIG. 5) and exist in standby mode until the next loading time is reached.

In this case, the first driving state (see (a) of FIG. 5) may be set to a state in which the movement prevention guide (222d) is in a position that does not interfere with the movement of the container (10) by the loading transfer means (221). For example, the first actuation state (see (a) of FIG. 5) may be set to a position in which the loading implement means (222-2) is rotated until the movement prevention guide (222d) is entirely on the outer side of the loading transfer means (221).

In addition, the second driving state (see (b) of FIG. 5) and the third driving state (see (c) of FIG. 5) may be set to a position in which the stretching line (M) of the stretchable part (222a) is formed in line with the loading line (L).

FIG. 6 illustrates various embodiments (10-1, 10-2, 10-3, 10-4) of the container (10).

Referring to FIG. 6, the container (10) is shown with at least a portion of it is cut to explain its configuration in detail.

The container (10) may comprise a first shape (10-1) configured with a first open portion (11) through which the stem (21) and leaves (22) of a planted plant (20) are exposed to the outside, a flange (14) formed for hanging and being supported on the plant cultivation guide (110), and at least one friction part (13) at a position outwardly contacting with the main transfer means (400).

An inner side of the container (10) may be filled with a medium (31) for fixing the plant (20) planted in the container (10) and preserving moisture and nutrition to be supplied to the corresponding plant (20).

The first opening (11) may be formed at the top of the container (10).

The friction part (13) may be provided in a ring shape surrounding the circumference of the container (10).

According to the friction part (13), in the container transfer process in which the push plate (420) is pushed against the container (10), the friction force generated between the push plate (420) and the friction part (13) allows the container (10) to rotate while being supported on the plant cultivation guide (110).

The rotation angle at which the container (10) is rotated may be adjusted according to the coefficient of friction of the friction part (13) and the push plate (420), and the speed and distance at which the push plate (420) is moved with the friction part (13) in contact with the push plate (420).

For example, the container (10) may be set to rotate 45 degrees counterclockwise each time the container transfer process is performed.

In other words, according to the friction part (13), the plants (20) planted in each container (10) can be rotated at a predetermined time interval so that the direction in which light is incident on each plant (20) is varied, thereby allowing each plant (20) to grow more efficiently.

In particular, when the position of the plant cultivation guide (110) is fixed, the direction of the natural light incident from the outside is formed in a certain direction, so that the plant (20) can be rotated as described above to promote more efficient growth.

In addition, the container (10) may comprise a second shape (10-2) configured with the first opening portion (11) and the friction part (13), and further having at least one hanging part (15), which is externally supported by the plant cultivation guide (110).

The container (10) may be supported on the hanging part (15) in such a way that the top of the hanging part (15) is supported with the bottom of the flange (14) by being in contact with the top of the hanging part (15).

The hanging part (15) may be provided in a ring shape surrounding the circumference of the container (10), and on one side and on the other side of the hanging part (15) a plurality of hanging structures may be formed which are hanged on the pair of guides (110a,110b) constituting the plant cultivation guide (110).

The hanging structure may comprise a plurality of hanging grooves (16-1,16-2,16-3,16-4), respectively, inserted into the pair of guides (110a,110b).

According to the hanging part (15) and the hanging grooves (16-1,16-2,16-3,16-4), the spacing between the pair of guides (110a,110b) can be kept constant while the hanging part (15) is moving along the plant cultivation guide (110), so that the container (10) can be more reliably supported on the plant cultivation guide (110). In addition, the container (10) may be prevented from being separated while moving along the pair of guides (110a,110b).

The hanging part (15) may comprise a configuration integrally formed with the container (10) or attached to the container (10).

In addition, the hanging part (15) may be configured to support the container (10) inwardly, and may be configured to be separate from the container (10), such that the container (10) may be rotatable separately from the hanging part (15).

When the container (10) is rotatable inside the hanging part (15) as described above, while the container (10) is rotated in a state in which the container (10) is supported by the hanging part (15) by the frictional force generated between the push plate (420) and the friction part (13) in the container transfer process, a force pushing the container (10) is transferred to the hanging part (15), and the hanging part (15) supported by the container (10) may move toward the harvesting part (330) along the plant cultivation guide (110).

In this case, the hanging part (15) moves with the hanging grooves (16-1,16-2,16-3,16-4) remaining engaged in the pair of guides (110a,110b), respectively, so that the container (10) is not rotated by the frictional force generated between the push plate (420) and the friction part (13), allowing the container (10) to be more securely supported on the plant cultivation guides (110).

In addition, the container (10) may be of a third shape (10-3), configured with the first open portion (11), the friction part (13) and the flange (14), and further having a second open portion (12) through which the roots (21) of the planted plant (20) are exposed to the outside.

The interior of the container (10) may be filled with fixing means (32) for fixing the plant (20) planted in the container (10).

One example of the fixture (32) is a sponge.

The second opening (12) may be formed at the bottom of the container (10).

According to the configuration in which the container (10) is equipped with the second opening (12) and the fixing means (32) as described above, compared to the first shape (10-1) and second shape (10-2) described above, the weight of the container (10) is lighter, so that the container (10) can be transferred using less energy. In addition, the cultivation environment inside the entire plant cultivation system can be kept cleaner, and it can be a solution to the problem of pest problem that may occur from the medium.

Furthermore, the container (10) may comprise a fourth shape (10-4), configured with the first opening (11), the friction part (13) and the hanging part (15), further having the second opening (12), and filled with the fixing means (32) inside the container (10).

Hereinafter, a plant cultivation system in which the plurality of plant cultivation guides (110) are adjacent to each other to form the plant cultivation guide surfaces (500, 510, 520, 530) will be described.

Referring to FIG. 7, the plant cultivation guide (110) may include a plurality of plant cultivation guides (110) disposed adjacent to each other to have a predetermined separation distance in a horizontal direction, and a predetermined angle (s) may be formed between the plant cultivation guides (110) adjacent to each other, and a separation distance (D2) between the harvesting part (330) may be greater than a separation distance (D1) between the start part (320).

That is, the plant cultivation guide (110) may be arranged such that the separation distance between neighboring plant cultivation guide (110) increases from the starting part (320) to the harvesting part (330).

Accordingly, a space suitable for the size of the plant (20) that gradually grows from the start part (320) toward the harvesting part (330) may be provided, and the quality of the harvested plant (20) may be further improved by preventing interference between neighboring plants (20), and the space may be more efficiently used.

The plant cultivation guide surfaces (500,510,520,530) comprise a plurality of neighboring plant cultivation guide (110) disposed as described above.

Referring to FIGS. 8 to 11, the plant cultivation guide surface (500) may comprise a circular guide surface (510), wherein the starting part (320) provided on each plant cultivation guide (110) is located at a center portion (0) of any circle, and the harvesting part (330) provided on each plant cultivation guide (110) is disposed along a circumference (C) of that circle.

FIG. 8 shows a perspective view of a circular plant cultivation system (1) with the circular guide surface (510), and FIG. 9 shows an enlarged view of portion 'A' shown in the drawing of FIG. 8.

Here, a shape in which the plurality of containers (10) are supported only in one plant cultivation guide (110) among the plurality of plant cultivation guides (110) constituting the circular guide surface (510) is illustrated, and the plurality of containers (10) supported by the remaining plant cultivation guides (110) and the plant (20) planted in the corresponding container (10) are omitted.

In the following descriptions, it is assumed that all of the omitted configurations are all illustrated.

According to the circular plant cultivation system (1), the start part side support column (630) is provided in the center (0) of the circle, the plurality of harvesting part side support column (640) are provided along the circumference (C) of the circle, and the circular guide surface (510) is formed between the start part side support column (630) and the plurality of harvesting part side support column (640).

In addition, a light source support (141) is provided on the upper side of each of the plant cultivation guide (110) comprising the circular guide surface (510), respectively, to provide a constant supply of light irradiated from the light source (140) to the plants (20) planted in the container (10) supported on each of the plant cultivation guide (110).

In addition, the first roller guide (611) may be supported on the plurality of harvesting part side support column (640) and disposed along the circumference of the circle (C), and the supply means support groove (631) may be formed in a ring shape along the circumference of the start part side support column (630). In addition, the supply means support member (832) may be a ring-shaped member configured to fit into the ring-shaped supply means support groove (631). (See FIG. 19)

Accordingly, the supply means guide (810) may be configured to rotate clockwise or counterclockwise in a circular motion about the start part side support column (630) such that the supply material supply means (130) sequentially supplies supply material to plants (20) planted in a plurality of containers (10) supported on a plurality of plant cultivation guide (110) comprising the circular guide surface (510).

In addition, the first roller guide (611) may be supported on the plurality of harvesting part side support column (640) and disposed along the circumference (C) of the circle, and the transfer means support groove (632) may be formed in a ring shape along the circumference of the start part side support column (630). In addition, the transfer means support member (432) may be a ring-shaped member configured to fit into the ring-shaped transfer means support groove (632).

Accordingly, the transfer means guide (410) may be configured to perform the container transfer process by rotating clockwise or counterclockwise in a circular motion about the start part side support column (630) and by sequentially transferring a plurality of containers (10) supported on a plurality of plant cultivation guide (110) that comprise the circular guide surface (510).

In addition, the unloading part (340) may be supported on the plurality of harvesting part side support column (640), which may be disposed in a ring configuration on the outer side of the harvesting part (330) of the plurality of plant cultivation guide (110) comprising the circular guide surface (510).

In addition, although not shown in the drawings, the unloading transfer means (231) may be arranged in a ring configuration along the unloading part (340).

In addition, although not shown, the loading part (310) may be supported along the circumference of the start part side support column (630) and disposed in a ring configuration on the outer side of the start portion (320) of the plurality of plant cultivation guide (110) comprising the circular guide surface (510), and the loading transfer means (221) may be disposed in a ring configuration along the loading part (310).

In addition, the lower boundary surface (700) may be provided in a circular shape between the start part side support column (630) and the plurality of harvesting part side support column (640) below the circular guide surface (510).

In addition, the circular plant cultivation system (1) may be configured so that the entire configuration is rotatable about the start part side support column (630), and may be provided with a system rotation drive (not shown) for rotating the start part side support column (630) and the configuration of the circular plant cultivation system (1) connected thereto.

To this end, the start part side support column (630) may be provided in the form of a hollow column that is rotatable, and may further be provided with a center column (650) that is a center of rotation within the start part side support column (630).

The center column (650) may be fixed to the ground.

According to the circular plant cultivation system (1) made rotatable as described above, the circular guide surface (510) can be rotated so that the direction in which natural light is incident on the plants (20) planted in the containers (10) supported on each plant cultivation guide (110) can be varied so that the plants (20) can be grown more efficiently.

FIG. 10 illustrates a circular multi-layered plant cultivation system (1-1) in which the circular plant cultivation system (1) is plurally stacked in the vertical direction to form a multilayer cultivation structure, and FIG. 11 illustrates a schematic vertical section of the circular multi-layered plant cultivation system (1-1).

The circular multi-layered plant cultivation system (1-1) is a plurality of circular plant cultivation systems (1) stacked with a predetermined vertical spacing (H) between them, wherein the vertical spacing (H) may be set according to the size of the plant (20) being cultivated and the setting of the amount of natural light incident, etc.

In other words, according to the above circular multi-layered plant cultivation system (1-1), since the amount and range of natural light incident on the lower layer of the circular plant cultivation system (1) may be limited by the configuration of the upper layer of the circular plant cultivation system (1), it is possible to appropriately set the above vertical spacing (H) so that, despite the configuration of the upper layer of the circular plant cultivation system (1), natural light is also incident on the plants (20) located on the inner side of the lower layer of the circular plant cultivation system (1), that is, on the side of the starting part (320).

In addition, the circular multi-layered plant cultivation system (1-1) may be configured so that the entire configuration rotates together around the center column (650).

In addition, the boundary of each layer of the circular plant cultivation system (1) may be provided with a layer boundary for creating an independent growing environment of each layer, and the layer boundary may be replaced by the lower boundary surface (700).

In addition, different plants (20) may be grown in each layer of the circular plant cultivation system (1) in different ways.

Also, referring to FIGS. 12 and 13, the plant cultivation guide surface (500) may comprise a fan-shaped guide surface (520) in which the starting part (320) provided on each plant cultivation guide (110) is located at a central portion (0') of any circle, and the harvesting part (330) provided on each plant cultivation guide (110) is disposed along an arc that is part of the circumference of the circle centered at the central portion (0').

FIG. 12 is a perspective view of a fan-shaped plant cultivation system (2) with the fan-shaped guide surface (520).

The center angle (θ) of the fan-shaped guide surface (520) may be formed at 180 degrees as shown in the figure, or may be formed to have various angles depending on the installation environment of the plant cultivation system.

The fan-shaped plant cultivation system (2) follows the configuration of the circular plant cultivation system (1, see FIG. 8), wherein the harvesting part side support column (640) are arranged in a plurality along the arc, and the fan-shaped guide surface (520) is formed between the start part side support column (630) and the plurality of harvesting part side support column (640).

In addition, the first roller guide (611) may be supported on the plurality of harvesting part side support column (640) and disposed along the arc, and the supply means support groove (631) may be arc-shaped around a portion of the circumference of the start part side support column (630).

Accordingly, the supply means guide (810) may be rotated clockwise or counterclockwise by the center angle (θ) about the start part side support column (630) to form a fan-shaped shape.

Additionally, although not shown in the drawings, the second roller guide (612) may be supported on the plurality of harvesting part side support column (640) and disposed along the arc, and the transfer means support groove (632) may be arc-shaped around a portion of the circumference of the start part side support column (630).

Accordingly, the transfer means guide (410) may be rotated clockwise or counterclockwise by the center angle (θ) about the start part side support column (630) to form a fan-shaped shape.

Additionally, the unloading part (340) may be supported on the plurality of harvesting part side support column (640) and disposed in an arc on the outer side of the harvesting part (330) of the plurality of plant cultivation guide (110) comprising the fan-shaped guide surface (520), and the unloading transfer means (231) may be disposed in an arc along the unloading part (340).

Additionally, although not shown in the drawings, the loading part (310) may be supported along the circumference of the start part side support column (630) to arc outside the start portion (320) of the plurality of plant cultivation guide (110) comprising the fan-shaped guide surface (520), and the loading transfer means (221) may be arranged in an arc shape along the loading part (310).

Additionally, the lower boundary surface (700) may be provided in a fan-shape between the start part side support column (630) and the plurality of harvesting part side support column (640) below the fan-shaped guide surface (520).

In addition, when a plurality of the above fan-shaped plant cultivation systems (2) are provided side by side, neighboring fan-shaped plant cultivation systems (2) are installed so that the straight portions (r) of each fan-shaped guide surface (520) face each other, so that the space (P) between each straight portion (r) can be utilized as a passage for a worker or a work robot or the like to move.

FIG. 13 shows a fan-shaped multi-layered plant cultivation system (2-1,2-2) in which the above fan-shaped plant cultivation system (2) is stacked multiple times in a vertical direction to form a multi-layered plant cultivation structure.

The fan-shaped multi-layered plant cultivation system (2-1,2-2) follows the configuration of the circular multi-layered plant cultivation system (1-1) and the fan-shaped plant cultivation system (2) described above.

In this case, as illustrated in the drawings, when the plurality of plant cultivation systems (2,2-1,2-2) are installed adjacent to each other, a low-level plant cultivation system (2) is provided at the front, and a high-level plant cultivation system (2-1,2-2) is provided at the rear, so that natural light is supplied more evenly to the plurality of plant cultivation systems (2,2-1,2-2).

In addition, referring to FIGS. 14 to 16, the plant cultivation guide surface (500) may comprise a spiral guide surface (530), wherein the starting part (320) provided on each plant cultivation guide (110) is located on an axis side of any spiral, and the harvesting part (330) provided on each plant cultivation guide (110) is disposed along a spiral (S) formed about the axis of the spiral.

FIG. 14 shows a perspective view of the plant cultivation system (3) of the present invention in which the spiral guide surface (530) is formed as a single layer.

The spiral plant cultivation system (3) follows the configuration of the circular plant cultivation system (1, see FIG. 8), wherein the harvesting part side support column (640) are provided in plurality along the spiral (S), and the spiral guide surface (530) is formed between the start part side support column (630) and the plurality of harvesting part side support column (640).

In addition, the first roller guide (611) is supported on the plurality of harvesting part side support column (640) and disposed along the spiral (S), the supply means support groove (631) may be formed in a spiral shape to correspond to the first roller guide (611) on a portion of the circumference of the start part side support column (630). In addition, the supply means support member (832) may be a spiral-shaped member configured to fit into at least a portion of the spiral-shaped supply means support groove (631). (See FIG. 20)

Accordingly, the supply means guide (810) rotates clockwise or counterclockwise about the start part side support column (630) and gradually rises or gradually descends while maintaining a predetermined vertical distance from the spiral guide surface (530).

In addition, the second roller guide (612) is supported on the plurality of harvesting part side support column (640) and disposed along the spiral (S), the transfer means support groove (632) may be formed in a spiral shape to correspond to the second roller guide (612) on a portion of the circumference of the start part side support column (630). In addition, the transfer means support member (432) may be a ring-shaped member configured to fit into the ring-shaped transfer means support groove (632). (See FIGS. 21, 22)

Accordingly, the transfer means guide (410) rotates clockwise or counterclockwise about the start part side support column (630) and gradually rises or gradually descends while maintaining a predetermined vertical distance from the spiral guide surface (530).

In addition, the unloading part (340) may be supported on the plurality of harvesting part side support column (640) and disposed in a spiral configuration on the outer side of the harvesting part (330) of the plurality of plant cultivation guide (110) comprising the spiral guide surface (530), and the unloading transfer means (231) may be disposed in a spiral configuration along the unloading part (340). (See FIG. 17)

In addition, the loading part (310) may be supported along the circumference of the start part side support column (630) and disposed in a spiral shape outside the starting part (320) of the plurality of plant cultivation guide (110) comprising the spiral guide surface (530), and the loading transfer means (221) may be disposed in a spiral shape along the loading part (310). (See FIG. 17)

In addition, the lower boundary surface (700) may be provided in a spiral shape between the start part side support column (630) and the plurality of harvesting part side support column (640) below the spiral guide surface (530), and a predetermined vertical interval may be formed between the lower boundary surface (700) and the spiral guide surface (530).

FIG. 15 illustrates a spiral multi-layered plant cultivation system (3-1) in which the spiral plant cultivation system (3) is extended so that the plurality of plant cultivation guide (110) are vertically positioned at a predetermined vertical interval to form a multi-layered planting structure, and FIG. 16 illustrates a schematic vertical section of the spiral multi-layered plant cultivation system (3-1).

The spiral multi-layered plant cultivation system (3-1) follows the configuration of the circular multi-layered plant cultivation system (1-1) and the fan-shaped plant cultivation system (3) described above.

In addition, the spiral multi-layered plant cultivation system (3-1) may include a plurality of the spiral plant cultivation systems (3) of the same shape, or a multi-layered plant cultivation system (not shown) in which the spiral multi-layered plant cultivation systems (3-1) share the same spiral axis and are arranged vertically to form multiple spirals.

For example, the spiral multi-layered plant cultivation system may comprise two spiral plant cultivation systems (3) of the same shape, or a double spiral structure plant cultivation system(not shown) in which the spiral multi-layered plant cultivation system (3-1) shares the same spiral axis and is arranged vertically to form a double spirals.

In the case of the double spiral structure plant cultivation system, a layer boundary may be provided between two spiral plant cultivation systems (3) or the spiral multi-layered plant cultivation system (3-1) to create an independent cultivation environment for each plant cultivation system, and the layer boundary may be replaced by the lower boundary surface (700).

In addition, in the double spiral structure plant cultivation system, two spiral plant cultivation systems (3) or the spiral multi-layered plant cultivation systems (3-1) may be configured as independent spaces, and different plants (20) may be cultivated in different ways.

FIG. 17 shows the loading transfer means (221) and the unloading transfer means (231) by the spiral multi-layered plant cultivation system (3-1).

According to the spiral multi-layered plant cultivation system (3-1), all layers of the spiral multi-layered plant cultivation system (3-1) are connected by the loading transfer means (221) and the unloading transfer means (231), so that the loading process and the unloading process can be carried out more efficiently.

For example, the loading transfer means (221) may comprise a conveyor belt installed to move in a spiral ascending from the lowest layer to the highest layer of the spiral multi-layered plant cultivation system (3-1).

According to the loading conveyor belt, the plurality of containers (10) may be loaded onto the loading conveyor belt and sequentially transferred to the loading part (310) of each layer, from the lowest layer to the highest layer of the spiral multi-layered plant cultivation system (3-1), so that the loading process may be carried out more efficiently.

In this case, as shown in the drawings, the conveyor belt for loading may have a circulation structure that returns directly from the top layer to the bottom layer of the spiral multi-layered plant cultivation system (3-1).

In addition, the unloading transfer means (231) may include a conveyor belt installed for descending and spiral movement from the top layer to the bottom layer of the spiral multi-layered plant cultivation system (3-1).

According to the unloading conveyor belt, the plurality of containers (10) unloaded into the unloading part (340) of each layer may be loaded onto the unloading conveyor belt and transferred downward sequentially, so that the unloading process may be performed more efficiently.

In this case, as shown in the drawings, the conveyor belt for unloading may have a circulation structure that returns directly from the lowest layer to the highest layer of the spiral multi-layered plant cultivation system (3-1).

In addition, although not shown in the drawings, the conveyor belt for loading and the conveyor belt for unloading may be formed of a single combined conveyor belt having an upper end and a lower end connected to each other.

The combined conveyor belt may have a circulation structure, which ascends and sequentially transfers the plurality of containers (10) to the loading part (310) of each layer from the lowest layer to the highest layer of the spiral multi-layered plant cultivation system (3-1), and then descends and sequentially transfers unloaded the plurality of containers (10) to the unloading part (340) of each layer.

FIG. 18 illustrates the first roller guide (611) and the supply means support groove (631), and the second roller guide (612) and the transfer means support groove (632) by the spiral multi-layered plant cultivation system (3-1).

According to the spiral multi-layered plant cultivation system (3-1), all layers of the spiral multi-layered plant cultivation system (3-1) are connected by the first roller guide (611) and the supply means support groove (631), so that the supply means guide (810) moves sequentially through all layers of the spiral multi-layered plant cultivation system (3-1).

Accordingly, the supply material supply means (130) can be sequentially transferred to each layer from the lowest layer to the highest layer of the spiral multi-layered plant cultivation system (3-1) and can sequentially supply the supply material to the plants (10) planted in the plurality of containers supported on each plant cultivation guide (110), and thus a supply material supply process of supplying a supply material may be performed more efficiently.

In this case, the supply means guide (810) may be configured to repeatedly move upward from the lowest layer of the spiral multi-layered plant cultivation system (3-1) to the highest layer along the first roller guide (611) and the supply means support groove (631), and return to the lowest layer by being spirally moved in the opposite direction.

Furthermore, according to the spiral multi-layered plant cultivation system (3-1), the second roller guide (612) and the transfer means support groove (632) are also provided in the same manner as the first roller guide (611) and the supply means support groove (631) respectively and may function in the same manner.

Accordingly, the transfer means guide (410) may be sequentially transferred to each layer from the lowest layer to the highest layer of the spiral multi-layered plant cultivation system (3-1), and the plurality of containers (10) supported on each plant cultivation guide (110) may be sequentially transferred, so that the container transfer process may be performed out more efficiently.

In this case, the transfer means guide (410) may be configured to repeatedly move upward from the lowest layer of the spiral multi-layered plant cultivation system (3-1) to the highest layer along the second roller guide (612) and the transfer means support groove (632), and return to the lowest layer by being spirally moved in the opposite direction.

The first roller guide (611) and the second roller guide (612) may be provided in a double spiral shape in which each spiral shares the same spiral axis and is vertically provided, and the supply means support groove (631) and the transfer means support groove (632) may also be provided in a double spiral shape disposed to correspond to the first roller guide (611) and the second roller guide (612) respectively.

Also, although not shown in the drawings, the second roller guide (612) and the first roller guide (611) are configured as one combined roller guide, so that the first roller (831) and the second roller (431) move along the combined roller guide, and the transfer means support groove (632) and the supply means support groove (631) may be provided with one combined support groove, so that the supply means support member (832) and the transfer means support member (432) moves along the combined support groove.

When the combined guide and the combined support groove are provided, the supply means guide (810) and the transfer means guide (410) are sequentially moved along the combined guide and the combined support groove to each layer of the spiral multi-layered plant cultivation system (3-1).

Referring to FIGS. 19 and 20, embodiments of the supply material transfer means (800) are shown in more detail.

The supply means guide (810) may be configured to intersect sequentially with a plurality of plant cultivation guide (110), which are arranged in parallel with the plant cultivation guide (110), moving in a perpendicular direction to the longitudinal direction of the plant cultivation guide (110) and forming a plant cultivation guide surfaces (500, 510,520,530) (see FIG. 8, FIG. 12, FIG. 14).

In FIG. 19, an embodiment of the supply material transfer means (800) is shown, which is provided in the circular multi-layered plant cultivation system (1-1, see FIG. 10).

According to this embodiment, there are multiple layers of the supply means support groove (631) in a ring shape around the start part side support column (630), and a supply means support member (832) in a ring shape is supported on the supply means support groove (631) of each layer, so that each layer is provided with the supply material transfer means (800).

In FIG. 20, there is shown an embodiment of the supply material transfer means (800) provided in the spiral multi-layered plant cultivation system (3-1, see FIG. 15).

The supply means support member (832) of the supply material transfer means (800) of this embodiment may be configured in a spiral shape, such as the spiral-shaped supply means support groove (631) shown in FIG. 18.

Here, the supply material transfer means (800) may include a plurality of supply means guides (810), and each supply means guide (810) may be formed of a multi-supply material transfer means having at least one supply material supply means (130), the first roller (831), and the supply material transfer means driving part (820) respectively.

The plurality of supply means guide (810) may be spaced at predetermined intervals, for example, may be disposed at an interval of 180' with respect to the axis of the spiral (see FIGS. 15 and 18).

Although not shown in the drawings, the above configuration of the multiple supply material transfer means may also be applied to other forms of plant cultivation systems according to the present invention, such as the circular plant cultivation system (1, see FIG. 8) and the circular multi-layered plant cultivation system (1-1, see FIG. 10) and the fan-shaped plant cultivation system (2, see FIG. 12) and the fan-shaped multi-layered plant cultivation system (2-1, see FIG. 13).

In FIGS. 21 to 23, embodiments of the main transfer means (400) are shown in more detail.

In FIG. 21, an embodiment of the main transfer means (400) provided in the spiral multi-layered plant cultivation system (3-1, see FIG. 15) is shown, and in FIG. 22, an embodiment in which the main transfer means (400) is provided in the spiral multi-layered plant cultivation system (3-1, see FIG. 15) and the container (10) supported on the plant cultivation guide (110) is transferred. In addition, in FIG. 23, an embodiment in which the container (10) supported on the plant cultivation guide (110) is transferred by the main transfer means (400) is shown in more detail.

Although not shown in the drawings, the configuration of the main transfer means (400) described below is applicable not only to the spiral multi-layered plant cultivation system (3-1) (see FIG. 15), but also to other forms of plant cultivation systems according to the present invention, such as the circular plant cultivation system (1) (see FIG. 8) and the circular multi-layered plant cultivation system (1-1) (see FIG. 10), and the fan-shaped plant cultivation system (2) (see FIG. 12) and the fan-shaped multi-layered plant cultivation system (2-1) (see FIG. 13).

The transfer means guide (410) of the main transfer means (400) may be arranged in parallel with the plant cultivation guide (110) to sequentially intersect with a plurality of plant cultivation guide (110) that move in a perpendicular direction to the longitudinal direction of the plant cultivation guide (110) and form plant cultivation guide surfaces (500,510,520,530) (see FIG. 8, FIG. 12, FIG. 14).

In addition, the transfer means guide (410) may be provided with a plurality of the push plates (420,420a,420b, 420c,420d,420e), such that a plurality of containers (10) supported on the plant cultivation guide (110) may be transferred by the plurality of push plates (420,420a,420b, 420c,420d,420e).

In this case, the push plates (420,420a,420b,420c,420d, 420e) may be provided in a number equal to the number of the plurality of containers (10) supported on each of the plant cultivation guide (110) to transfer the containers (10) located at each arrangement position to the next arrangement position respectively.

To this end, the plurality of push plates (420,420 a,420 b,420 c,420 d,420 e) may be provided at predetermined intervals to correspond to the arrangement position in which the plurality of containers (10) supported by the plant cultivation guide (110) are disposed.

For example, referring to FIG. 23, when each plant cultivation guide (110) includes a start part (320) and a harvesting part (330) on which five containers (10) are supported, and a first cultivation position (321-1), a second cultivation position (322-1), and a third cultivation position (323-1) between the starting part (320) and the harvesting part (330), the five push plates (420,420 a,420 b,420 c,420 d,420 e) for pushing the respective containers (10) may be provided.

Here, the five push plates (420,420a,420b,420c,420d, 420e) include a first push plate (420a) for pushing the container (10) located at the starting part (320) to the first cultivation position (321-1), a second push plate (420b) for pushing the container (10) located at the first cultivation position (321-1) to the second cultivation position (322-1), a third push plate (420c) for pushing the container (10) located at the second cultivation position (322-1) to the third cultivation position (323-1), a fourth push plate (420d) for pushing the container (10) located at the third cultivation position (323-1) to the harvesting part (330), and a fifth push plate (420e) for pushing the container (10) located at the harvesting part (330) to the unloading part (340).

In this case, the fifth push plate (420e) serves as the unloading means for transferring the container (10) located in the harvesting part (330) to the unloading part (340).

In addition, each of the push plates (420,420 a,420 b,420 c,420 d,420 e) may be provided to be inclined such that the respective push plates (420,420 a,420 b,420 c,420 d,420 e) form a predetermined crossing angle (X 1,X 2,X 3,X 4,X 5) set in each of the plant cultivation guide (110) and the horizontal plane when the transfer means guide (410) is moved.

Accordingly, each container (10) in contact with each push plate (420,420a,420b,420c,420d,420e) is pushed toward the harvesting part (330) while each push plate (420,420a,420b,420c,420d,420e) is moved perpendicular to the longitudinal direction of the plant cultivation guide (110) by the movement of the transfer means guide (410).

Here, according to the crossing angle and the horizontal length of each push plate (420,420a,420b,420c,420d,420e), the transfer distance of each container (10) pushed by each push plate (420,420a,420b,420c,420d,420e) is varied.

In other words, the larger the intersection angle, the shorter the horizontal length of the push plate, the shorter the transfer distance of each container (10), and the smaller the crossing angle, the longer the horizontal length of the push plate, the longer the transfer distance of each container (10).

For example, if the spacing of the containers (10) is set to become gradually wider from the starting part (320) toward the harvesting part (330) (see FIG. 1), each of the push plates (420,420a,420b,420c,420d,420e) may be configured to form a longer transfer distance from the starting part (320) toward the harvesting part (330).

That is, the shortest transfer distance for the container (10) located at the starting part (320) to be transferred to the first cultivation position (321-1) by the first push plate (420a), followed by the transfer distance for the container (10) located at the first cultivation position (321-1) to be transferred to the second cultivation position (322-1) by the second push plate (420b), the distance by which the container (10) located at the second cultivation position (322-1) is transferred to the third cultivation position (323-1) by the third push plate (420c), the distance by which the container (10) located at the third cultivation position (323-1) is transferred to the harvesting part (330) by the fourth push plate (420d), and so on, may be gradually lengthened. In addition, the longest transfer distance for the container (10) located at the harvesting part (330) to be transferred to the unloading part (340) by the fifth push plate (420e) may be formed.

To this end, the push plate corresponding to the container (10) located on the harvesting part (330) side may be configured to form a smaller crossing angle.

That is, the crossing angles (X1,X2,X3,X4,X5) are such that the crossing angle (X5) between the plant cultivation guide (110) and the fifth push plate (420e) is the smallest, followed by the crossing angle (X4) between the plant cultivation guide (110) and the fourth push plate (420d), the crossing angle (X3) between the plant cultivation guide (110) and the third push plate (420c), the crossing angle (X2) between the plant cultivation guide (110) and the second push plate (420b), and the sequential angles become larger in order, and the crossing angle (X1) between the plant cultivation guide (110) and the first push plate (420a) may be formed the largest.

In addition, the push plate corresponding to the container located at the harvesting part may be made to have a longer horizontal length.

That is, the horizontal length of the fifth push plate (420e) may be the longest, the length of the fourth push plate (420d), the third push plate (420c), and the second push plate (420b) may be sequentially shortened, and the horizontal length of the first push plate (420a) may be the shortest.

In addition, the plurality of push plates (420,420a,420b, 420c,420d,420e) may be configured to move simultaneously by movement of the transfer means guide (410), but may be sequentially transferred from the container located at the harvest part (330).

That is, the plurality of push plates (420,420a,420b,420c, 420d,420e), the fifth push plate (420e) first contacts and pushes against the container (10) at the harvesting part (330), then the fourth push plate (420d) contacts and pushes against the container (10) at the third cultivation position (323-1), then the third push plate (420c) contacts and pushes against the container (10) at the second cultivation position (322-1), then the second push plate (420b) contacts and pushes against the container (10) at the first cultivation position (321-1), the first push plate (420a) contacts and pushes against the container (10) at the starting part (320), so that the container transfer process may be performed smoothly.

To this end, the plurality of push plates (420, 420a, 420b, 420c, 420d, 420e) may be provided to cross the plant cultivation guide (110) first as the push plate corresponding to the container (10) located at the harvest part is larger when the transfer means guide (410) moves.

In other words, as the transfer means guide (410) moves and crosses with the plant cultivation guide (110), the plurality of push plates (420,420a,420b,420c,420d,420e) provided on the transfer means guide (410) also cross with the plant cultivation guide (110) and push out the container (10) provided on the plant cultivation guide (110) respectively. At this time, the fifth push plate (420e), the fourth push plate (420d), the third push plate (420c), the second push plate (420b), and the first push plate (420a) may be arranged to cross with the corresponding plant cultivation guide (110) in that order.

Accordingly, the container (10) provided in the corresponding plant cultivation guide (110) are sequentially transferred in the order of the container (10) located at the harvesting part (330), the container (10) located at the third planting position, the container (10) located at the second planting position, the container (10) located at the first planting position.

To this end, the transfer means guide (410) may be configured to meet and cross the plant cultivation guide (110) at an angle in a horizontal plane, such that the crossing point with the plant cultivation guide (110) is first at the harvesting part (330) of the plant cultivation guide and then gradually moves towards the starting part (320).

For example, the transfer means guide (410) may comprise a curved transfer means guide (410*a*) as shown in the figure. The transfer means guide (410) may further comprise a transfer means guide support (410*b*), with a harvesting part (330) end connected to the curved transfer means guide (410*a*) and a starting part (320) end connected to the transfer means support member (432) to stably support the curved transfer means guide (410*a*).

Furthermore, the main transfer means (400) is arranged so that the transfer means guide (410) moves in a set forward direction (R1) to perform a container transfer process of transferring the plurality of containers (10) supported on the plurality of plant cultivation guide (110) by moving from one side of the plant cultivation guide (110) to the other side. Then, the transfer means guide (410) may be configured to move to a set reverse direction (R2) to perform a return movement process in which the transfer means guide (410) returns to its original position by moving from the other side of the plant cultivation guide (110) to one side.

In the circular plant cultivation system (1, see FIG. 8) and the circular multi-layered plant cultivation system (1-1, see FIG. 10), in the fan-shaped plant cultivation system (2, see FIG. 12), the fan-shaped multi-layered plant cultivation system (2-1, see FIG. 13), in the spiral plant cultivation system (3, see FIG. 14), and the spiral multi-layered plant cultivation system (3-1, see FIG. 15), the forward direction (R1) may be a clockwise or counterclockwise rotation direction to rotate with respect to a vertical axis or a spiral axis passing through the center (01,02) of the circle. In addition, the reverse direction (R2) may be a reverse rotation direction of the forward direction (R1).

For performing the container transfer process and the return movement process, the push plates (420,420*a*,420*b*,420*c*,420*d*,420*e*) may include a fixed plate (421) fixed to the transfer means guide (410), and a hinged plate (422) connected to the fixed plate (421).

The push plates (420,420*a*,420*b*,420*c*,420*d*,420*e*) may comprise a configuration wherein the plant cultivation guide (110) is provided with the fixed plate (421) in a position where they are not contact with the plant cultivation guide (110) and the containers (10) supported thereon and the plants (20) planted in those containers (10) during movement, and the hinged plate (422) at a position meeting each container (10).

For example, the fixed plate (421) and the hinged plate (422) may be vertically connected, and in particular, the hinged plate (422) may be connected to the upper side of the fixed plate (421), such that the fixed plate (421) is configured to move to the lower side of the container (10) during movement of the transfer means guide (410), and the hinged plate (422) may be configured to push against the side surface of the container (10).

The hinge may be a unidirectional hinge, such that when a force in the reverse direction (R2) is applied to the hinged plate (422), the hinged plate (422) remains closed, and when a force in the forward direction (R1) is applied to the hinged plate (422), the hinged plate (422) is opened while rotating in the forward direction (R1) with respect to a hinge axis (axis-h).

In addition, the fixed plate (421) and the hinged plate (422) may be spring-connected with the hinge interposed therebetween.

Accordingly, in the process of the container transfer process, as the transfer means guide (410) moves in the forward direction (R1), each container (10) comes into contact with the other side of the hinged plate (422), and a pushing force from each container (10) is applied to the hinged plate (422) in the reverse direction (R2).

Accordingly, while the container transfer process is being performed, the hinged plate (422) remains closed, and the plurality of containers (10) are pushed and transferred by the plurality of push plates (420,420*a*,420*b*,420*c*,420*d*,420*e*).

In addition, in the return movement process, as the transfer means guide (410) moves in the reverse direction (R2), each container (10) comes into contact with one side of the hinged plate (422), and a pushing force from each container (10) is applied to the hinged plate (422) in the forward direction (R1).

Accordingly, in the return movement process, the hinged plate (422) is pushed to each container (10) to be rotated in the forward direction (R1), and then the contact state with the corresponding container (10) is terminated, and as the force applied from the corresponding container (10) disappears, the hinged plate (422) rotates in the reverse direction (R2) and is closed by the restoring force of the spring.

That is, according to the return movement process, while repeatedly moving and closing each of the hinged plate (422) in each container (10), each container (10) may maintain a position without being pushed by the hinged plate (422), and the plurality of push plates (420, 420*a*, 420*b*, 420*c*, 420*d*, 420*e*) may return without affecting the configurations of the present invention, such as the plurality of containers (10).

In addition, the main transfer means (400) may be a multi-main transfer means in which a plurality of transfer means guides (410) are connected to the transfer means support member (432), and at least one of the push plates (420, 420*a*, 420*b*, 420*c*, 420*d*, 420*e*), the second roller (431), and the main transfer means driving part (440) are provided in each transfer means guide (410).

The plurality of transfer means guides (410) may be disposed at predetermined intervals, for example, 180' with respect to the axis of the spiral (see FIGS. 15 and 18).

Hereinafter, with reference to FIGS. 24 to 26, a house-type plant cultivation system (4-1,4-2) comprising a house structure (910) will be described according to the present invention.

The house structure (910) is configured to be enclosed within the plurality of plant cultivation guide (110) to create a cultivation environment for the plant (20) planted in the container (10).

The house structure (910) may be configured to be partially or wholly detachable to allow for communication with the outside when necessary.

For example, a portion of the house structure (910) may be arbitrarily drawn to ventilate the internal air and then be closed again.

The house structure (910) may be formed of a material through which natural light is transmitted from the outside to be incident into the house structure (910).

In FIG. 24, a fixed house type plant cultivation system (4-1) with a rectangular walled house structure (910) is shown in accordance with one embodiment of the present invention.

The fixed house-type plant cultivation system (4-1) is provided with at least one door (930) connecting the interior and exterior of the house structure (910), and a worker or a working robot may move through the door (930).

According to the above fixed house-type plant cultivation system (4-1), a bottom part (920) is installed on the ground, and on top of the bottom part (920), the fan-shaped plant cultivation system (2) and the fan-shaped multi-layered plant cultivation system (2-1,2-2) are installed, so that a more appropriate cultivation environment for plants can be created inside the house structure (910) by minimizing the influence from the ground.

Inside the fixed house-type plant cultivation system (4-1), the fan-shaped plant cultivation system (2) and the fan-shaped multi-layered plant cultivation system (2-1,2-2) illustrated in the drawings, as well as the circular plant cultivation system (1, see FIG. 8) and the circular multi-layered plant cultivation system (1-1, see FIG. 10), and the spiral plant cultivation system (3, see FIG. 14) and the spiral multi-layered plant cultivation system (3-1, see FIG. 15), various plant cultivation systems according to the present invention may be applied.

FIG. 25 illustrates a rotary house-type plant cultivation system (4-2) with a cylindrical walled house structure (910) in accordance with another embodiment of the present invention.

The rotating house-type plant cultivation system (4-2) follows the house-type plant cultivation system (4-1, FIG. 24), with the difference that the house structure (910) comprises a cylindrical wall structure and is configured to rotate with respect to the center column (650).

As shown in the drawings, the rotating house-type plant cultivation system (4-2) may comprise a configuration in which the cylindrical walled house structure (910) is provided as an outer side of the spiral multi-layered plant cultivation system (3-1) (see FIG. 15), with a bottom boundary part (940) installed at the bottom, and a plurality of floor rollers (950) provided between the bottom boundary part (940) and the bottom part (920). (See FIG. 26)

Here, the center column (650) of the spiral multi-layered plant cultivation system (3-1) (see FIG. 15) is fixed to the bottom part (920) and the ground to support the rotating house-type plant cultivation system (4-2) for stable rotation.

As shown in the drawings, the plurality of floor rollers (950) may be installed in a floor roller installation part (951) provided at a top of the bottom part (920), to support a bottom of the bottom boundary part (940) that rotates with respect to the center column (650).

To this end, the bottom of the bottom boundary part (940) may be provided with rails (not shown) for setting relative movement paths of the plurality of floor rollers (950) on the bottom boundary part (940).

In addition, the plurality of floor rollers (950) may be installed in a floor roller installation (951) provided at the bottom of the bottom boundary part (940), supported at the top of the bottom part (920) and configured to rotate with the bottom boundary part (940) with respect to the center column (650).

To this end, a top of the bottom part (920) may be provided with rails (not shown) for setting a movement path for the plurality of floor rollers (950) on the bottom part (920).

According to the rotary house-type plant cultivation system (4-2), various plant cultivation system configurations, such as the circular plant cultivation system (1, see FIG. 8) and the circular multi-layered plant cultivation system (1-1, see FIG. 10) and the spiral plant cultivation system (3, see FIG. 14) may be applied to the inside of the house structure (910).

In addition, according to the present invention, a plurality of house-type plant cultivation systems (4-1,4-2) as described above may be provided at predetermined intervals to form a cultivation complex (5).

FIG. 27 illustrates one embodiment of the above cultivation complex (5), in which a plurality of the rotary house-type plant cultivation systems (4-2) are provided.

The cultivation complex (5) may be configured such that each rotary house-type plant cultivation system (4-2) is connected to each other by an arbitrary connection member (960).

According to the mutual connection configuration as described above, a plurality of rotary house-type plant cultivation systems (4-2) can be mutually supported to maintain a stable state despite external environments such as strong wind, heavy rain, and earthquake.

To this end, each rotary house-type plant cultivation system (4-2) may be provided with a connecting column (660) extending from the center column (650), and a connecting member (960) may be connected to a connecting part (670) provided on the connecting column (660).

In addition, a fixing member (960) a for firmly fixing a position by connecting at least a portion of the plurality of rotary house-type plant cultivation systems (4-2) connected to each other by the connection member (960) to a ground or an external fixture may be further provided.

The fixing member (960a) may be connected, in particular, to a rotary house-type plant cultivation system (4-2) located at an edge of the plurality of rotary house-type plant cultivation systems (4-2) comprising the planting complex (5).

In addition, the fixing member (960a) may be connected to the ground or to an external fixture through the connecting part (670) to which the connecting member (960) is connected.

As described above, the present invention is not limited to the above-described embodiment, and may be modified by one of ordinary skill in the art to which the present invention pertains without departing from the technical idea of the present invention claimed in the claims, and such a modification is within the scope of the present invention.

What is claimed is:

1. A plant cultivation system comprising:
   a central part;
   plant cultivation guides extending radially from the central part; and
   a main transfer means;
   wherein,
   the plant cultivation guides are configured to arrange and support a plurality of containers containing plants,
   each of the plant cultivation guides comprises a starting part and a harvesting part, wherein the starting part is positioned at the central part such that a container containing plants to grow is loaded at the starting part, and the harvesting part is positioned along a circumference formed with respect to the central part such that plants are harvested at the harvesting part and a container containing grown plants is unloaded at the harvesting part,
   the plant cultivation system is configured to sequentially transport the plurality of containers from the starting part to the harvesting part along each of the plant cultivation guides and continuously cultivated according to a growth stage of theplanted plants by the main transfer means, and
   the main transfer means is configured to sequentially transport the plurality of containers from the starting part to the harvesting part along each of the plant cultivation guides by rotating about an axis of the central part, contacting the plurality of containers, and pushing the plurality of containers toward the harvesting part, wherein the main transfer means comprises:
 a transfer means guide that moves in a perpendicular direction with respect to a longitudinal direction of the plant cultivation guides by rotating about an axis of the central part, and is provided to cross the plant cultivation guides; and
 a plurality of push plates that are fixed to the transfer means guide and are in contact with the plurality of containers according to the movement of the transfer means guide to push and transfer the plurality of containers toward the harvesting part.

2. The plant cultivation system of claim 1,
wherein in the plant cultivation guides, the plurality of containers are arranged at the same interval, or the plurality of containers are arranged at intervals gradually wider from the starting part toward the harvesting part according to the growth stage of the planted plants, so that a space having a size suitable for a growth step of the plants planted in each container is allocated.

3. The plant cultivation system of claim 1,
wherein the plant cultivation guides are disposed to be adjacent in a horizontal direction, and a separation distance between neighboring plant cultivation guides is disposed to be widened from the starting part toward the harvesting part.

4. The plant cultivation system of claim 3,
wherein the plurality of plant cultivation guides form a circular guide surface in which the starting part provided in each plant cultivation guide is located at a central part of a circle, and the harvesting part provided in each plant cultivation guide is disposed along a circumference of the circle; or
the plurality of plant cultivation guides form a fan-shaped guide surface in which the starting part provided in each plant cultivation guide is located at a central part of a circle, and the harvesting part provided in each plant cultivation guide is disposed an arc that is part of the circumference of the circle.

5. The plant cultivation system of claim 3,
wherein the plurality of plant cultivation guides form a spiral guide surface in which the starting part provided in each plant cultivation guide is located at an axial side of a spiral, and the harvesting part provided in each plant cultivation guide is formed along a spiral formed around an axis of the spiral.

6. The plant cultivation system of claim 5,
wherein a plurality of spiral guide surfaces are formed, and
the plurality of spiral guide surfaces are stacked in a vertical direction at a set separation distance to form a multi-spiral structure.

7. The plant cultivation system of claim 3,
wherein a plurality of guide surfaces comprising the plurality of plant cultivation guides are formed, and
the plurality of guide planes are stacked in a vertical direction at a set separation distance to form a multi-layered cultivation structure.

8. The plant cultivation system of claim 7,
wherein in the multi-layered cultivation structure, a layer boundary part is formed between neighboring guide surfaces, blocking each other and forming an independent cultivation environment in each layer.

9. The plant cultivation system of claim 3, further comprising:
 a lower boundary surface provided on a lower side of the guide surface comprising the plurality of plant cultivation guides, and stacking waste generated during a cultivation process of plant planted in a container supported on the guide surface; and
 a cleaning means for supplying fluid to sweep the waste accumulated on the lower boundary surface.

10. The plant cultivation system of claim 3,
wherein a center column, which is a structure provided outside a starting part of the plurality of plant cultivation guides, is provided, and
the plurality of plant cultivation guides are rotatable about the center column.

11. The plant cultivation system of claim 3, further comprising:
 a house structure configured to block the outside and inside, and enclose the inside with the plurality of plant cultivation guides therein to create a cultivation environment of the plant planted in the container,
 a plurality of plant cultivation systems including the plurality of plant cultivation guides and the house structure surrounding the plurality of plant cultivation guides are provided at regular intervals to form a collective cultivation complex, and
wherein the collective cultivation complex is supported by interconnecting the plurality of plant cultivation systems, and wherein at least a portion of the interconnected plurality of plant cultivation systems is connected to the ground or an external fixture to be fixed in position.

12. The plant cultivation system of claim 1,
wherein each plant cultivation guide is provided such that a vertical height of each plant cultivation guide gradually decreases from the starting part toward the harvesting part.

13. The plant cultivation system of claim 1,
further comprising:
a loading means for loading and settling the container in which the plant is planted into the starting part; and
an unloading means for unloading the container positioned in the harvesting part.

14. The plant cultivation system of claim 13,
wherein the loading means comprises a loading implement means for transferring and settling the container located in the loading part to the starting part, and a loading transfer means for supporting the container and transferring the container from the outside to a loading part;
the unloading means comprises unloading implement means for transferring the container located in the harvesting part to an unloading part, and an unloading transfer means for supporting and transferring the container from the unloading part to the outside.

15. The plant cultivation system of claim 1,
wherein the main transfer means is configured to transfer the container at predetermined time intervals according to the growth rate of plant planted in the container.

16. The plant cultivation system of claim 1,
wherein each of the plurality of push plates is provided such that a set cross angle is formed between the plurality of push plates and the plant cultivation guide.

17. The plant cultivation system of claim 16,
wherein the plurality of push plates are fixed to the transfer means guide at predetermined intervals so as to correspond to the positions of the plurality of containers supported by the respective plant cultivation guide, wherein a push plate corresponding to a container located closer to the harvesting part has a smaller cross angle formed between the push plate and the plant cultivation guide, or is configured to have a longer horizontal length, so that a container located closer to the harvesting part are configured to be transported a longer transport distance.

18. The plant cultivation system of claim 16, wherein the plurality of push plates are configured to simultaneously transfer containers corresponding to the respect push plate while simultaneously crossing the plant cultivation guide when the transfer means guide moves, or the plurality of push plates are configured to sequentially cross with the plant cultivation guide, wherein the push plate corresponding to the containers located closer to the harvesting part are crossed first, and the containers located closer to the harvesting part are transferred in order.

19. The plant cultivation system of claim 16, wherein the main transfer means is configured to perform a container transfer process wherein the transfer means guide moves in a set forward direction to transfer the plurality of containers supported on the plurality of plant cultivation guides by moving from one side of the plant cultivation guides to the other side, and then performs a return movement process wherein the transfer means guide moves in a set reverse direction to return to an original position by moving from the other side of the plant cultivation guides to the one side, the push plate includes a fixed plate fixed to the transfer means guide, and a hinged plate hinge-connected to the fixed plate and configured to contact a container corresponding to the push plate by movement of the transfer means guide, the hinge is a one-way hinge, wherein the hinge is configured such that when the hinged plate is subjected to a force in the reverse direction, the hinged plate is maintained in a closed state, and when the hinged plate is subjected to a force in the forward direction, the hinged plate is opened while rotating in the forward direction relative to a hinge shaft.

20. The plant cultivation system of claim 19, wherein the fixed plate and the hinged plate are spring-connected with the hinge interposed therebetween, so that in the process of the return movement process, the hinged plate is pushed against each container to rotate and open in the forward direction, and then, as the contact with the container is terminated and the force exerted by the container disappears, the hinged plate is rotated and closed in the reverse direction by the restoring force of the spring.

21. The plant cultivation system of claim 1, wherein at least one hanging part is provided on an outer side of the container, supported by the plant cultivation guide, and configured to support the container inward.

22. The plant cultivation system of claim 21, wherein the plant cultivation guide comprises a pair of guides provided in parallel, and a plurality of hanging structures formed on one side and the other side of the hanging part are respectively supported on the pair of guides so that one side and the other side of the container are supported by the pair of plant cultivation guides.

23. The plant cultivation system of claim 21, wherein the hanging part is configured to be separate from the container and configured to be rotatable in a state in which the container is supported inside the hanging part.

24. The plant cultivation system of claim 1, wherein a friction part is provided on an outer side of the container at a position in contact with the push plate, and when the push plate is pushed against the container, the container is rotated in a predetermined direction by a friction force generated between the push plate and the friction part.

25. The plant cultivation system of claim 1, wherein the container has a shape including a first opening through which stems and leaves of the planted plants are exposed to the outside, and a second opening through which roots of the planted plants are exposed to the outside.

26. The plant cultivation system of claim 1, wherein a supply material supply means for supplying at least one of the supply materials comprising water and nutrients to a plant planted in the plurality of containers is installed;

the supply material supply means is configured to move an upper side or a lower side of a guide surface formed of the plurality of plant cultivation guides and to supply at least one of the supply materials to plants planted in the plurality of containers respectively supported on the plurality of plant cultivation guides.

27. The plant cultivation system of claim 26, wherein the supply material supply means is configured to supply the supply materials in a suitable manner according to the growth stage of the plant planted in the container.

* * * * *